US009665384B2

(12) United States Patent
Zielinski et al.

(10) Patent No.: US 9,665,384 B2
(45) Date of Patent: May 30, 2017

(54) AGGREGATION OF COMPUTING DEVICE SETTINGS

(75) Inventors: Tobiasz A. Zielinski, Redmond, WA (US); Ravipal S. Soin, Sammamish, WA (US); Kamesh C. Tumsi Dayakar, Redmond, WA (US); William Mak, Seattle, WA (US); Guy Barker, Kirkland, WA (US); Jennifer R. Stallard, Redmond, WA (US); Ryan E. Cukierman, Redmond, WA (US); Christopher M. Hahn, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 670 days.

(21) Appl. No.: 13/550,432

(22) Filed: Jul. 16, 2012

(65) Prior Publication Data

US 2012/0290962 A1 Nov. 15, 2012

Related U.S. Application Data

(63) Continuation of application No. 11/215,052, filed on Aug. 30, 2005.

(51) Int. Cl.
*G06F 3/048* (2013.01)
*G06F 9/445* (2006.01)
*G06F 3/0481* (2013.01)
*G06F 3/0484* (2013.01)

(52) U.S. Cl.
CPC .......... *G06F 9/4451* (2013.01); *G06F 3/0481* (2013.01); *G06F 3/0484* (2013.01)

(58) Field of Classification Search
CPC ..... G06F 3/0481; G06F 3/0484; G06F 9/4451

USPC .................................................. 715/765, 810
See application file for complete search history.

(56) References Cited

U.S. PATENT DOCUMENTS

| 4,823,283 | A | 4/1989 | Diehm et al. |
| 5,045,997 | A | 9/1991 | Watanabe |
| 5,046,001 | A | 9/1991 | Barker et al. |
| 5,189,732 | A | 2/1993 | Kondo |
| 5,258,748 | A | 11/1993 | Jones |
| 5,297,032 | A | 3/1994 | Trojan et al. |

(Continued)

FOREIGN PATENT DOCUMENTS

| CN | 1326564 | 12/2001 |
| CN | 1591305 | 3/2005 |

(Continued)

OTHER PUBLICATIONS

"Rename a file", taken from windows.microsoft.com/en-us/windows7/rename-a-file, published Aug. 24, 2009, 1 page.*

(Continued)

*Primary Examiner* — William Bashore
*Assistant Examiner* — Gregory A DiStefano

(57) ABSTRACT

Aggregation of computing device settings is disclosed. In embodiments, at least one tile is generated for display. The tile represents a system setting and a status of the system setting. The tile also includes one or more user-selectable elements that are selectable to adjust an aspect of the system setting. In addition, the tile is displayed and is presentable in different user interfaces with one or more aspects of the tile differing between two or more of the different user interfaces.

20 Claims, 8 Drawing Sheets

(56) References Cited

U.S. PATENT DOCUMENTS

| | | |
|---|---|---|
| 5,321,750 A | 6/1994 | Nadan |
| 5,339,392 A | 8/1994 | Risberg et al. |
| 5,432,932 A | 7/1995 | Chen et al. |
| 5,463,725 A | 10/1995 | Henckel et al. |
| 5,485,197 A | 1/1996 | Hoarty |
| 5,495,566 A | 2/1996 | Kwatinetz |
| 5,515,495 A | 5/1996 | Ikemoto |
| 5,574,836 A | 11/1996 | Broemmelsiek |
| 5,598,523 A | 1/1997 | Fujita |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,659,693 A * | 8/1997 | Hansen et al. ................. 715/779 |
| 5,675,329 A | 10/1997 | Barker |
| 5,680,562 A | 10/1997 | Conrad et al. |
| 5,687,331 A | 11/1997 | Volk et al. |
| 5,712,995 A | 1/1998 | Cohn |
| 5,740,389 A | 4/1998 | Li et al. |
| 5,771,042 A | 6/1998 | Santos-Gomez |
| 5,793,415 A | 8/1998 | Gregory et al. |
| 5,819,284 A | 10/1998 | Farber et al. |
| 5,844,547 A | 12/1998 | Minakuchi et al. |
| 5,847,706 A | 12/1998 | Kingsley |
| 5,860,073 A | 1/1999 | Ferrel et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A * | 12/1999 | Jones et al. .................... 713/1 |
| 6,011,542 A | 1/2000 | Durrani et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,163,317 A | 12/2000 | de Judicibus |
| 6,163,749 A | 12/2000 | McDonough et al. |
| 6,166,736 A | 12/2000 | Hugh |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,311,058 B1 | 10/2001 | Wecker et al. |
| 6,369,837 B1 | 4/2002 | Schirmer |
| 6,385,630 B1 | 5/2002 | Ejerhed |
| 6,389,386 B1 | 5/2002 | Hetherington et al. |
| 6,396,963 B2 | 5/2002 | Shaffer |
| 6,411,307 B1 | 6/2002 | Rosin et al. |
| 6,414,698 B1 | 7/2002 | Lovell et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,493,002 B1 * | 12/2002 | Christensen .......... G06F 3/0481 715/772 |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,662,023 B1 | 12/2003 | Helle |
| 6,675,387 B1 | 1/2004 | Boucher et al. |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,738,084 B1 | 5/2004 | Kelley et al. |
| 6,784,925 B1 | 8/2004 | Tomat |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,938,101 B2 | 8/2005 | Hayes et al. |
| 6,961,731 B2 | 11/2005 | Holbrook |
| 6,971,067 B1 | 11/2005 | Karson et al. |
| 6,972,776 B2 | 12/2005 | Davis et al. |
| 6,975,306 B2 | 12/2005 | Hinckley et al. |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,180,527 B2 | 2/2007 | Sakai et al. |
| 7,194,506 B1 | 3/2007 | White et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,262,775 B2 | 8/2007 | Calkins et al. |
| 7,263,668 B1 | 8/2007 | Lentz |
| 7,280,097 B2 | 10/2007 | Chen |
| 7,283,620 B2 | 10/2007 | Adamczyk |
| 7,289,806 B2 | 10/2007 | Morris et al. |
| 7,293,244 B2 | 11/2007 | Randall |
| 7,296,184 B2 | 11/2007 | Derks et al. |
| 7,296,242 B2 | 11/2007 | Agata et al. |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |

(56) References Cited

U.S. PATENT DOCUMENTS

| | | |
|---|---|---|
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,412,663 B2 | 8/2008 | Lindsay et al. |
| 7,424,686 B2 * | 9/2008 | Beam .................. G06F 3/0481 707/999.102 |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,500,175 B2 | 3/2009 | Colle et al. |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,669,140 B2 * | 2/2010 | Matthews et al. ............ 715/779 |
| 7,671,756 B2 | 3/2010 | Herz et al. |
| 7,694,221 B2 | 4/2010 | Fortes |
| 7,702,683 B1 | 4/2010 | Kirshenbaum |
| 7,755,674 B2 | 7/2010 | Kaminaga |
| 7,792,925 B1 | 9/2010 | Werner et al. |
| 7,834,861 B2 | 11/2010 | Lee |
| 7,844,915 B2 | 11/2010 | Platzer et al. |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,903,115 B2 | 3/2011 | Platzer et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,028,239 B1 * | 9/2011 | Al-Hilali ............... G06F 9/4443 715/762 |
| 8,065,629 B1 | 11/2011 | Ragan |
| 8,086,275 B2 | 12/2011 | Wykes |
| 8,108,781 B2 | 1/2012 | Laansoo et al. |
| 8,131,808 B2 | 3/2012 | Aoki et al. |
| 8,150,924 B2 | 4/2012 | Buchheit et al. |
| 8,171,431 B2 | 5/2012 | Grossman et al. |
| 8,175,653 B2 | 5/2012 | Smuga |
| 8,176,438 B2 | 5/2012 | Zaman et al. |
| 8,209,623 B2 | 6/2012 | Barletta et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,250,494 B2 | 8/2012 | Butcher |
| 8,255,473 B2 | 8/2012 | Eren et al. |
| 8,255,812 B1 | 8/2012 | Parparita et al. |
| 8,269,736 B2 | 9/2012 | Wilairat |
| 8,279,241 B2 | 10/2012 | Fong |
| 8,307,279 B1 | 11/2012 | Fioravanti et al. |
| 8,384,726 B1 | 2/2013 | Grabowski et al. |
| 8,429,565 B2 | 4/2013 | Agarawala et al. |
| 8,448,083 B1 | 5/2013 | Migos et al. |
| 8,473,870 B2 | 6/2013 | Hinckley et al. |
| 8,493,510 B2 | 7/2013 | Bryan et al. |
| 8,525,808 B1 | 9/2013 | Buening |
| 8,539,384 B2 | 9/2013 | Hinckley et al. |
| 8,548,431 B2 | 10/2013 | Teng et al. |
| 8,560,959 B2 | 10/2013 | Zaman et al. |
| 8,589,815 B2 | 11/2013 | Fong et al. |
| 8,612,874 B2 | 12/2013 | Zaman et al. |
| 8,627,227 B2 | 1/2014 | Matthews et al. |
| 8,665,272 B2 | 3/2014 | Fitzmaurice et al. |
| 8,669,950 B2 | 3/2014 | Forstall et al. |
| 8,687,023 B2 | 4/2014 | Markiewicz et al. |
| 8,689,123 B2 | 4/2014 | Zaman et al. |
| 8,706,515 B2 | 4/2014 | Cobbs et al. |
| 8,830,270 B2 | 9/2014 | Zaman et al. |
| 8,893,033 B2 | 11/2014 | Donahue et al. |
| 8,922,575 B2 | 12/2014 | Garside et al. |
| 8,933,952 B2 | 1/2015 | Zaman et al. |
| 8,935,631 B2 | 1/2015 | Leonard et al. |
| 8,990,733 B2 | 3/2015 | Deutsch et al. |
| 9,141,262 B2 | 9/2015 | Nan et al. |
| 9,146,670 B2 | 9/2015 | Zaman et al. |
| 9,158,445 B2 | 10/2015 | Wong et al. |
| 9,213,468 B2 | 12/2015 | Zaman et al. |
| 9,229,918 B2 | 1/2016 | Zaman et al. |
| 9,244,802 B2 | 1/2016 | Yalovsky et al. |
| 9,383,917 B2 | 7/2016 | Mouton et al. |
| 9,418,464 B2 | 8/2016 | Fong et al. |
| 9,423,951 B2 | 8/2016 | Deutsch et al. |
| 9,535,597 B2 | 1/2017 | Wong et al. |
| 9,557,909 B2 | 1/2017 | Elliott et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0026524 A1 | 2/2002 | Dharap |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0083025 A1 * | 6/2002 | Robarts ................... G06F 1/163 706/12 |
| 2002/0091755 A1 | 7/2002 | Narin |
| 2002/0097264 A1 | 7/2002 | Dutta et al. |
| 2002/0105531 A1 | 8/2002 | Niemi |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0149622 A1 | 10/2002 | Uesaki et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0165923 A1 | 11/2002 | Prince |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0231327 A1 * | 12/2003 | Ashey ................... G06F 3/1204 358/1.13 |
| 2004/0066414 A1 | 4/2004 | Czerwinski et al. |

(56) References Cited

U.S. PATENT DOCUMENTS

| | | |
|---|---|---|
| 2004/0068543 A1 | 4/2004 | Seifert |
| 2004/0078299 A1 | 4/2004 | Down-Logan |
| 2004/0111673 A1* | 6/2004 | Bowman .............. G06F 9/4443 715/234 |
| 2004/0128359 A1 | 7/2004 | Horvitz et al. |
| 2004/0155908 A1 | 8/2004 | Wagner |
| 2004/0185883 A1 | 9/2004 | Rukman |
| 2004/0189707 A1 | 9/2004 | Moore et al. |
| 2004/0212586 A1 | 10/2004 | Denny |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0250217 A1 | 12/2004 | Tojo et al. |
| 2004/0266491 A1 | 12/2004 | Howard et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0050462 A1* | 3/2005 | Whittle et al. .................. 715/517 |
| 2005/0054384 A1 | 3/2005 | Pasquale et al. |
| 2005/0058353 A1 | 3/2005 | Matsubara |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0081155 A1 | 4/2005 | Martin et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0143138 A1 | 6/2005 | Lee et al. |
| 2005/0149879 A1 | 7/2005 | Jobs et al. |
| 2005/0156947 A1 | 7/2005 | Sakai et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0188406 A1 | 8/2005 | Gielow et al. |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0156228 A1 | 7/2006 | Gallo et al. |
| 2006/0161863 A1 | 7/2006 | Gallo |
| 2006/0172724 A1 | 8/2006 | Linkert et al. |
| 2006/0173911 A1 | 8/2006 | Levin et al. |
| 2006/0176403 A1 | 8/2006 | Gritton et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0236264 A1 | 10/2006 | Cain et al. |
| 2006/0246955 A1 | 11/2006 | Nirhamo et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0288280 A1 | 12/2006 | Makela |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0028267 A1 | 2/2007 | Ostojic et al. |
| 2007/0035513 A1 | 2/2007 | Sherrard et al. |
| 2007/0038567 A1 | 2/2007 | Allaire et al. |
| 2007/0044039 A1 | 2/2007 | Amadio et al. |
| 2007/0050724 A1 | 3/2007 | Lee et al. |
| 2007/0054679 A1 | 3/2007 | Cho et al. |
| 2007/0055770 A1 | 3/2007 | Karmakar et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt et al. |
| 2007/0067737 A1 | 3/2007 | Zielinski et al. |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0094045 A1 | 4/2007 | Cobbs et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0152961 A1 | 7/2007 | Dunton et al. |
| 2007/0157089 A1 | 7/2007 | Van Os et al. |
| 2007/0171192 A1 | 7/2007 | Seo et al. |
| 2007/0180381 A1 | 8/2007 | Rice |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192726 A1 | 8/2007 | Kim et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0225022 A1 | 9/2007 | Satake |
| 2007/0233654 A1 | 10/2007 | Karlson |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy et al. |
| 2007/0250787 A1 | 10/2007 | Kawahara et al. |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |

(56) References Cited

U.S. PATENT DOCUMENTS

| | | |
|---|---|---|
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0028294 A1 | 1/2008 | Sell et al. |
| 2008/0032681 A1 | 2/2008 | West |
| 2008/0034318 A1 | 2/2008 | Louch et al. |
| 2008/0036743 A1 | 2/2008 | Westerman |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0065607 A1 | 3/2008 | Weber |
| 2008/0072173 A1 | 3/2008 | Brunner et al. |
| 2008/0076472 A1 | 3/2008 | Hyatt |
| 2008/0082911 A1 | 4/2008 | Sorotokin et al. |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0094368 A1 | 4/2008 | Ording et al. |
| 2008/0095100 A1 | 4/2008 | Cleveland et al. |
| 2008/0098093 A1 | 4/2008 | Simon et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0122796 A1 | 5/2008 | Jobs |
| 2008/0132252 A1 | 6/2008 | Altman et al. |
| 2008/0138030 A1 | 6/2008 | Bryan et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0158189 A1 | 7/2008 | Kim |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0165210 A1 | 7/2008 | Platzer et al. |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0215475 A1 | 9/2008 | Ramer et al. |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0225014 A1 | 9/2008 | Kim |
| 2008/0242362 A1 | 10/2008 | Duarte |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0284798 A1 | 11/2008 | Weybrew et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0309626 A1 | 12/2008 | Westerman et al. |
| 2008/0313540 A1 | 12/2008 | Dirks et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031243 A1 | 1/2009 | Kano et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0055749 A1 | 2/2009 | Chatterjee et al. |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0079740 A1 | 3/2009 | Fitzmaurice et al. |
| 2009/0083656 A1 | 3/2009 | Dukhon |
| 2009/0085851 A1 | 4/2009 | Lim |
| 2009/0085878 A1 | 4/2009 | Heubel |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0094562 A1 | 4/2009 | Jeong et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0125844 A1 | 5/2009 | Weir et al. |
| 2009/0132942 A1 | 5/2009 | Santoro et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144652 A1 | 6/2009 | Wiley |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0171920 A1 | 7/2009 | Wade et al. |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0189868 A1 | 7/2009 | Joo et al. |
| 2009/0193358 A1 | 7/2009 | Mernyk et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0284657 A1 | 11/2009 | Roberts et al. |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293013 A1 | 11/2009 | O'Shaugnessy et al. |
| 2009/0298547 A1 | 12/2009 | Kim et al. |

(56) References Cited

U.S. PATENT DOCUMENTS

| | | |
|---|---|---|
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0322760 A1 | 12/2009 | Kwiatkowski et al. |
| 2009/0327969 A1 | 12/2009 | Estrada |
| 2010/0008490 A1 | 1/2010 | Gharachorloo et al. |
| 2010/0010934 A1 | 1/2010 | Barry et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0030578 A1 | 2/2010 | Siddique et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0057566 A1 | 3/2010 | Itzhak |
| 2010/0058226 A1 | 3/2010 | Flake et al. |
| 2010/0058248 A1 | 3/2010 | Park |
| 2010/0066698 A1 | 3/2010 | Seo |
| 2010/0070931 A1 | 3/2010 | Nichols |
| 2010/0073160 A1 | 3/2010 | Gilmour et al. |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0088641 A1 | 4/2010 | Choi |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0121705 A1 | 5/2010 | Ramer et al. |
| 2010/0122110 A1 | 5/2010 | Ordogh |
| 2010/0123737 A1 | 5/2010 | Williamson et al. |
| 2010/0138767 A1 | 6/2010 | Wang et al. |
| 2010/0145675 A1 | 6/2010 | Lloyd et al. |
| 2010/0146384 A1 | 6/2010 | Peev et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0216491 A1 | 8/2010 | Winkler et al. |
| 2010/0223569 A1 | 9/2010 | Vuong et al. |
| 2010/0223627 A1 | 9/2010 | Sharma |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0281481 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0295789 A1 | 11/2010 | Shin et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0328431 A1 | 12/2010 | Kim et al. |
| 2010/0329642 A1 | 12/2010 | Kam et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0035702 A1 | 2/2011 | Williams et al. |
| 2011/0043527 A1 | 2/2011 | Ording et al. |
| 2011/0055773 A1 | 3/2011 | Agarawala et al. |
| 2011/0055775 A1 | 3/2011 | Saito et al. |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087988 A1 | 4/2011 | Ray et al. |
| 2011/0093778 A1 | 4/2011 | Kim et al. |
| 2011/0093815 A1 | 4/2011 | Gobeil |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0124376 A1 | 5/2011 | Kim et al. |
| 2011/0126156 A1 | 5/2011 | Krishnaraj et al. |
| 2011/0138313 A1 | 6/2011 | Decker et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167403 A1 | 7/2011 | French et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175930 A1 | 7/2011 | Hwang et al. |
| 2011/0202866 A1 | 8/2011 | Huang et al. |
| 2011/0209039 A1 | 8/2011 | Hinckley et al. |
| 2011/0209089 A1 | 8/2011 | Hinckley et al. |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0258563 A1 | 10/2011 | Lincke |
| 2011/0276864 A1 | 11/2011 | Oules |
| 2011/0283188 A1 | 11/2011 | Farrenkopf et al. |
| 2011/0316884 A1 | 12/2011 | Giambalvo et al. |
| 2012/0005584 A1 | 1/2012 | Seago et al. |
| 2012/0009903 A1 | 1/2012 | Schultz et al. |
| 2012/0017162 A1 | 1/2012 | Khokhlov |

(56) References Cited

U.S. PATENT DOCUMENTS

| | | |
|---|---|---|
| 2012/0028687 A1 | 2/2012 | Wykes |
| 2012/0050185 A1 | 3/2012 | Davydov et al. |
| 2012/0050332 A1 | 3/2012 | Nikara et al. |
| 2012/0062604 A1 | 3/2012 | Lobo |
| 2012/0081310 A1 | 4/2012 | Schrock |
| 2012/0089950 A1 | 4/2012 | Tseng |
| 2012/0102433 A1 | 4/2012 | Falkenburg |
| 2012/0124469 A1 | 5/2012 | Nakajima et al. |
| 2012/0151397 A1 | 6/2012 | Oberstein et al. |
| 2012/0159395 A1 | 6/2012 | Deutsch et al. |
| 2012/0159402 A1 | 6/2012 | Nurmi et al. |
| 2012/0167008 A1 | 6/2012 | Zaman |
| 2012/0167011 A1 | 6/2012 | Zaman |
| 2012/0169593 A1 | 7/2012 | Mak et al. |
| 2012/0174005 A1 | 7/2012 | Deutsch |
| 2012/0174029 A1 | 7/2012 | Bastide et al. |
| 2012/0176401 A1 | 7/2012 | Hayward et al. |
| 2012/0179992 A1 | 7/2012 | Smuga |
| 2012/0210265 A1 | 8/2012 | Delia et al. |
| 2012/0212495 A1 | 8/2012 | Butcher et al. |
| 2012/0216139 A1 | 8/2012 | Ording et al. |
| 2012/0233571 A1 | 9/2012 | Wever et al. |
| 2012/0236035 A1 | 9/2012 | Kimura |
| 2012/0244841 A1 | 9/2012 | Teng |
| 2012/0254780 A1 | 10/2012 | Mouton et al. |
| 2012/0265644 A1 | 10/2012 | Roa et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0311436 A1 | 12/2012 | Steele et al. |
| 2012/0311485 A1 | 12/2012 | Caliendo, Jr. et al. |
| 2012/0323992 A1 | 12/2012 | Brobst et al. |
| 2013/0031508 A1 | 1/2013 | Kodosky et al. |
| 2013/0033525 A1 | 2/2013 | Markiewicz et al. |
| 2013/0042203 A1 | 2/2013 | Wong et al. |
| 2013/0042206 A1 | 2/2013 | Zaman et al. |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard |
| 2013/0067420 A1 | 3/2013 | Pittappilly |
| 2013/0093757 A1 | 4/2013 | Cornell |
| 2013/0169649 A1 | 7/2013 | Bates |
| 2013/0176316 A1 | 7/2013 | Bates |
| 2013/0219332 A1 | 8/2013 | Woley |
| 2014/0082552 A1 | 3/2014 | Zaman |
| 2014/0109008 A1 | 4/2014 | Zaman |
| 2015/0046829 A1 | 2/2015 | Donahue et al. |
| 2015/0058763 A1 | 2/2015 | Leonard et al. |
| 2015/0317062 A1 | 11/2015 | Jarrett et al. |
| 2015/0378554 A1 | 12/2015 | Jan et al. |
| 2015/0378594 A1 | 12/2015 | Zaman et al. |
| 2016/0041710 A1 | 2/2016 | Zaman et al. |
| 2016/0041711 A1 | 2/2016 | Zaman et al. |
| 2016/0041730 A1 | 2/2016 | Zaman et al. |
| 2016/0070357 A1 | 3/2016 | Huang et al. |
| 2016/0110090 A1 | 4/2016 | Patten et al. |
| 2017/0068428 A1 | 3/2017 | Wong et al. |

FOREIGN PATENT DOCUMENTS

| | | |
|---|---|---|
| CN | 1734440 | 2/2006 |
| CN | 1845054 | 10/2006 |
| CN | 1902575 | 1/2007 |
| CN | 1904823 | 1/2007 |
| CN | 101036104 | 9/2007 |
| CN | 101114303 | 1/2008 |
| CN | 101233477 | 7/2008 |
| CN | 101233504 | 7/2008 |
| CN | 101578577 | 11/2009 |
| CN | 101809531 | 8/2010 |
| CN | 101981522 | 2/2011 |
| CN | 102004603 | 4/2011 |
| CN | 102033710 | 4/2011 |
| CN | 102197702 | 9/2011 |
| CN | 102460370 | 5/2012 |
| EP | 0583060 | 2/1994 |
| EP | 1353505 | 10/2003 |
| EP | 1752868 | 2/2007 |
| EP | 1939718 | 7/2008 |
| EP | 2262193 | 12/2010 |
| EP | 2659347 | 11/2013 |
| GB | 2350991 | 12/2000 |
| JP | H0744351 | 2/1995 |
| JP | 2000293280 | 10/2000 |
| JP | 2003513350 | 4/2003 |
| JP | 2004227393 | 8/2004 |
| JP | 2004357257 | 12/2004 |
| JP | 2005527888 | 9/2005 |
| JP | 2006268849 | 10/2006 |
| JP | 2006293989 | 10/2006 |
| JP | 2006323672 | 11/2006 |
| JP | 2007058740 | 3/2007 |
| JP | 2007516496 | 6/2007 |
| JP | 2007195186 | 8/2007 |
| JP | 2008508600 | 3/2008 |
| JP | 2008527540 | 7/2008 |
| JP | 2008234042 | 10/2008 |
| JP | 2008276584 | 11/2008 |
| JP | 2009265929 | 11/2009 |
| JP | 2009266192 | 11/2009 |
| JP | 2010039761 | 2/2010 |
| JP | 2010073099 | 4/2010 |
| JP | 2011048835 | 3/2011 |
| JP | 2011070525 | 4/2011 |
| JP | 2011516936 | 5/2011 |
| JP | 2011128029 | 6/2011 |
| JP | 2011170523 | 9/2011 |
| JP | 2012527684 | 11/2012 |
| JP | 2012256147 | 12/2012 |
| KR | 200303655 | 2/2003 |
| KR | 20060019198 | 3/2006 |
| KR | 1020070036114 | 4/2007 |
| KR | 20070093084 | 9/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| KR | 20100010072 | 2/2010 |
| KR | 20100048375 | 5/2010 |
| KR | 20100056369 | 5/2010 |
| KR | 102010005636 | 5/2010 |
| RU | 2409833 | 4/2009 |
| RU | 2363033 | 7/2009 |
| RU | 2412463 | 1/2010 |
| TW | 201023026 | 6/2010 |
| TW | 201037592 | 10/2010 |
| TW | I333157 | 11/2010 |
| WO | WO-9926127 | 5/1999 |

(56) References Cited

FOREIGN PATENT DOCUMENTS

| WO | WO-0129976 | 4/2001 |
|---|---|---|
| WO | WO-03075547 | 9/2003 |
| WO | WO-2005026931 | 3/2005 |
| WO | WO-2005027506 | 3/2005 |
| WO | WO-2006019639 | 2/2006 |
| WO | WO-2006074267 | 7/2006 |
| WO | WO-2007065019 | 6/2007 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2009000043 | 12/2008 |
| WO | WO-2009012398 | 1/2009 |
| WO | WO-2009049331 | 4/2009 |
| WO | WO-2009158310 | 12/2009 |
| WO | WO-2010024969 | 3/2010 |
| WO | WO-2010036660 | 4/2010 |
| WO | WO-2010041826 | 4/2010 |
| WO | WO-2010048229 | 4/2010 |
| WO | WO-2010048448 | 4/2010 |
| WO | WO-2010048519 | 4/2010 |
| WO | WO-2010110613 | 9/2010 |
| WO | WO-2010117643 | 10/2010 |
| WO | WO-2010125451 | 11/2010 |
| WO | WO-2010134718 | 11/2010 |
| WO | WO-2010135155 | 11/2010 |
| WO | WO-2011041885 | 4/2011 |
| WO | WO-2012088485 | 6/2012 |
| WO | WO-2012166188 | 12/2012 |

OTHER PUBLICATIONS

"Non-Final Office Action", U.S. Appl. No. 12/972 967 (Jan. 30, 2013),19 pages.
"Non-Final Office Action", U.S. Appl. No. 12/977,584, (Dec. 7, 2012), 8 pages.
"Non-Final Office Action", U.S. Appl. No. 12/978,184, (Jan. 23, 2013), 7 pages.
"Non-Final Office Action", U.S. Appl. No. 13/118,339, (Feb. 11, 2013),15 pages.
"Non-Final Office Action", U.S. Appl. No. 13/118,347, (Feb. 12, 2013),14 pages.
"Non-Final Office Action", U.S. Appl. No. 13/196,272, (Feb. 6, 2013),10 pages.
"Non-Final Office Action", U.S. Appl. No. 13/224,258, (Jan. 8, 2013), 35 pages.
"Non-Final Office Action", U.S. Appl. No. 13/492,495, (Dec. 19, 2012), 6 pages.
"Non-Final Office Action", U.S. Appl. No. 13/655,386, (Dec. 26, 2012), 23 pages.
"Non-Final Office Action", U.S. Appl. No. 13/656,354, (Feb. 6, 2013),10 pages.
"Non-Final Office Action", U.S. Appl. No. 13/656,574, (Jan. 31, 2013), 21 pages.
"Non-Final Office Action", U.S. Appl. No. 13/657,621, (Feb. 7, 2013),19 pages.
"Non-Final Office Action", U.S. Appl. No. 13/657,646, (Jan. 3, 2013),13 pages.
"Non-Final Office Action", U.S. Appl. No. 13/657,789, (Jan. 9, 2013), 38 pages.
"PCT Search Report and Written Opinion", Application No. PCT/US2011/067075, (Dec. 12, 2012),10 pages.
Livingston, et al., "Windows 95 Secrets", 1995, *I DG Books Worldwide*, 3rd Edition, (1995), pp. 121-127.
Perry, Greg "Teach Yourself Windows 95 in 24 Hours", 1997, *Sams Publishing*, 2nd Edition (1997), pp. 193-198.
"Corrected Notice of Allowance", U.S. Appl. No. 13/656,574, Jan. 13, 2015, 4 pages.
"Final Office Action", U.S. Appl. No. No. 13/229,693, Jan. 6, 2015, 24 pages.

"Final Office Action", U.S. Appl. No. 13/229,702, Jan. 15, 2015, 24 pages.
"Final Office Action", U.S. Appl. No. 13/657,621, Jan. 15, 2015, 22 pages.
"Foreign Office Action", CN Application No. 201210331158.8, Sep. 3, 2014, 16 Pages.
"Non-Final Office Action", U.S. Appl. No. 13/229,155, Jan. 7, 2015, 14 pages.
Camick, "Wrap Layout", Java Tips Weblog, retrieved from <https://tips4java.wordpress.com/2008/11/06/wrap-layout/> on Nov. 11, 2015, Nov. 6, 2008, 28 pages.
"Adobe Acrobat 8 Standard User Guide", Adobe Systems Incorporated,(2007),pp. 34 & 36.
"Advisory Action", U.S. Appl. No. 12/414,382, (Jan. 20, 2012),3 pages.
"Advisory Action", U.S. Appl. No. 12/433,605, (Apr. 5, 2012),3 pages.
"Alltel Adds Dedicated Search Key to Phones", Retrieved from: <http://www.phonescoop.com/news/item.php?n=2159> on Nov. 26, 2008., (Apr. 12, 2007),2 Pages.
"Android 2.3 User's Guide", AUG-2.3-103, Android mobile technology platform 2.3,(Dec. 13, 2010),380 pages.
"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007),11 pages.
"Application User Model IDs", Retrieved from: <http://msdn.microsoft.com/en-us/library/dd378459(VS.85).aspx> on Sep. 28, 2010, (2010),6 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008),3 pages.
"Basics of Your Device: Get Familiar with the Home Screen", Nokia USA—How to, retrieved from <http://www.nokia.ca/get-support-and-software/product-support/c6-01/how-to#> on May 11, 2011,3 pages.
"Blackberry office tools: Qwerty Convert", Retrieved from: <http://blackberrysoftwarelist.net/blackberry/download-software/blackberry-office/qwerty_convert.aspx> on Nov. 20, 2008, (Nov. 20, 2008),1 page.
"Calc4M", Retrieved from: <http://www.hellebo.com/Calc4M.html> on Nov. 11, 2008, (Sep. 10, 2008),4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, (2009),5 Pages.
"Dial a number", Retrieved from: <http://www.phonespell.org/ialhelp.html> on Nov. 20, 2008, (Nov. 20, 2008),1 page.
"DuoSense™ Multi-Touch Gestures", Retrieved from <http://www.n-trig.com/Data/Uploads/Misc/DuoSenseMTG_final.pdf>, (Jul. 2008),4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009),2 pages.
"Email Notification for Microsoft Outlook and Outlook Express", Retrieved from: <http://www.contextmagic.com/express-notification/> on Sep. 29, 2010, (Jul. 21, 2004),3 pages.
"Enhanced IBM Power Systems Software and PowerVM Restructuring", *IBM United States Announcement 208-082*, dated Apr. 8, 2008, available at <http://www.ibm.com/common/ssi/rep_ca/2/897/ENUS208-082/ENUS208082.pdf>, (Apr. 8, 2008), pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008),14 pages.
"Extended European Search Report", European Patent Application No. 09818253.8, (Apr. 10, 2012),7 pages.

(56) References Cited

OTHER PUBLICATIONS

"eXtreme Energy Conservation: Advanced Power-Saving Software for Wireless Devices", *White Paper, Freescale Semiconductor, Inc., Document No. XTMENRGYCNSVWP, Rev #0*, available at <http://www.freescale.com/files/32bit/doc/white_paper/XTMENRGYCNSVWP.pdf>,(Feb. 2006),15 pages.
"Final Office Action", U.S. Appl. No. 11/305,789, (Apr. 1, 2009),10 pages.
"Final Office Action", U.S. Appl. No. 11/502,264, (Feb. 4, 2010),15 pages.
"Final Office Action", U.S. Appl. No. 11/502,264, (Apr. 3, 2009),9 pages.
"Final Office Action", U.S. Appl. No. 12/244,545, (Dec. 7, 2011),16 pages.
"Final Office Action", U.S. Appl. No. 12/244,545, (Sep. 7, 2012),23 pages.
"Final Office Action", U.S. Appl. No. 12/413,977, (Nov. 17, 2011),16 pages.
"Final Office Action", U.S. Appl. No. 12/414,382, (Dec. 23, 2011),7 pages.
"Final Office Action", U.S. Appl. No. 12/414,476, (Dec. 1, 2011),20 pages.
"Final Office Action", U.S. Appl. No. 12/433,605, (Feb. 3, 2012),11 pages.
"Final Office Action", U.S. Appl. No. 12/433,667, (Sep. 13, 2011),17 pages.
"Final Office Action", U.S. Appl. No. 12/469,458, (Nov. 17, 2011),15 pages.
"Final Office Action", U.S. Appl. No. 12/469,480, (Feb. 9, 2012),17 pages.
"Final Office Action", U.S. Appl. No. 12/484,799, (Apr. 30, 2012),13 pages.
"Final Office Action", U.S. Appl. No. 12/560,081, (Mar. 14, 2012),16 pages.
"Freeware.mobi", Retrieved from: <http://www.palmfreeware.mobi/download-palette.html> on Nov. 6, 2008, (Oct. 9, 2001),2 pages.
"GnomeCanvas", Retrieved from: <http://library.gnome.org/devel/libgnomecanvas/unstable/GnomeCanvas.html> Sep. 28, 2010, 11 pages.
"How Do I Cancel a "Drag" Motion on an Android Seekbar?", retrieved from <http://stackoverflow.com/guestions/2917969/how-do-i-cancel-a-drag-motion-on-an-android-seekbar> on Jun. 20, 2011,(May 28, 2010),1 page.
"How do I use Categories with my Weblog?", Retrieved from: <http://tpsupport.mtcs.sixapart.com/tp/us-tp1/how_do_i_use_categories_with_my_weblog.html>on Sep. 28, 2010, (Sep. 16, 2009),3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007),24 pages.
"HTC Shows HTC Snap with Snappy Email Feature", Retrieved from: <http://www.wirelessandmobilenews.com/smartphones/_on 5/5/09>, (May 4, 2009),10 Pages.
"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008),11 pages.
"International Search Report and Written Opinion", International Application No. PCT/US2011/055521, (May 15, 2012),9 pages.
"International Search Report and Written Opinion", International Application No. PCT/US2011/055522, (May 15, 2012),9 pages.
"International Search Report and Written Opinion", International Application No. PCT/US2011/055514, (May 22, 2012),8 pages.
"International Search Report", Application No. PCT/US2010/028553, Application Filing Date: Mar. 24, 2010,9 pages.

"Internet Explorer Window Restrictions", Retrieved from: http://technet.microsoft.com/en-us/library/cc759517(WS.10).aspx on Jun. 28, 2011, Microsoft TechNet,5 pages.
"Introduction to Windows Touch", Retrieved from: <http://download.microsoft.com/download/a/d/f/adf1347d-08dc-41a4-9084-623b1194d4b2/Win7_touch.docx>, (Dec. 18, 2008),pp. 1-7.
"iPad User Guide", retrieved from <http://cyndidannerkuhn.info/CDK/iPads_Resources_files/iPad_User_Guide.pdf> on Jun. 17, 2011,154 pages.
"iPod touch User Guide for iPhone OS 3.0 Software", Apple Inc.,(2009),153 pages.
"Keyboard (5)", Retrieved from: <http://landru.uwaterloo.ca/cgi-bin/man.cgi?section=5&topic=keyboard> on Dec. 11, 2008., (Aug. 11, 1997),8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005),5 pages.
"Kiosk Browser Chrome Customization Firefox 2.x", Retrieved from: <http://stlouis-shopper.com/cgi-bin/mozdev-wiki/,p1?ChromeCustomization> on Oct. 22, 2008 Making a new chrome for the kiosk browser, Kiosk Project Kiosk Browser Chrome Customization Firefox-2.x,(Aug. 16, 2007),2 pages.
"Live Photo Gallery—Getting Started—from Camera to Panorama", Retrieved from: <http://webdotwiz.spaces.live.com/blog/cns!278276075213932331!1729.entry> on May 5, 2009., (Sep. 2008),7 Pages.
"Magic mouse", Retrieved from: <http://www.apple.com/magicmouse/> on May 10, 2011,3 pages.
"MIDTB Tip Sheet: Book Courier", Retrieved from: <http://www.midtb.org/tipsbookcourier.htm> on Dec. 11, 2008., (Sep. 26, 2005),6 Pages.
"Mobile/UI/Designs/TouchScreen", Retrieved from: <https://wiki.mozilla.org/Mobile/UI/Designs/TouchScreen>on May 6, 2009., (Feb. 3, 2009),15 Pages.
"moGo beta v.0.4", Retrieved from: <http://forum.xda-developers.com/showthread.php?t=375196> on Sep. 27, 2010, (Mar. 7, 2008),10 pages.
"Multi-touch", Retrieved from <http://en.wikipedia.org/wiki/Multi-touch#Microsoft_Surface> on Apr. 24, 2009, (Apr. 17, 2009),8 pages.
"New Features in WhatsUp Gold v12.0", retrieved from <http://www.netbright.co.th/?name=product&file=readproduct&id=12> on Jun. 10, 2011,4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.
"Non-Final Office Action", U.S. Appl. No. 11/305,789, (Sep. 21, 2009),5 pages.
"Non-Final Office Action", U.S. Appl. No. 11/502,264, (Sep. 30, 2009),15 pages.
"Non-Final Office Action", U.S. Appl. No. 11/502,264, (Sep. 14, 2012),14 pages.
"Non-Final Office Action", U.S. Appl. No. 12/244,545, (Mar. 27, 2012),18 pages.
"Non-Final Office Action", U.S. Appl. No. 12/244,545, (Aug. 17, 2011),15 pages.
"Non-Final Office Action", U.S. Appl. No. 12/413,977, (Jul. 19, 2011),17 pages.
"Non-Final Office Action", U.S. Appl. No. 12/413,977, (Jul. 20, 2012),18 pages.
"Non-Final Office Action", U.S. Appl. No. 12/414,382, (Jul. 26, 2011),9 pages.
"Non-Final Office Action", U.S. Appl. No. 12/414,434, (Jan. 17, 2012),7 pages.
"Non-Final Office Action", U.S. Appl. No. 12/414,434, (May 31, 2012),7 pages.
"Non-Final Office Action", U.S. Appl. No. 12/414,434, (Aug. 2, 2011),6 pages.
"Non-Final Office Action", U.S. Appl. No. 12/414,455, (Aug. 29, 2011),8 pages.

(56) References Cited

OTHER PUBLICATIONS

"Non-Final Office Action", U.S. Appl. No. 12/414,458, (Jul. 6, 2011),8 pages.
"Non-Final Office Action", U.S. Appl. No. 12/414,476, (Nov. 9, 2012),22 pages.
"Non-Final Office Action", U.S. Appl. No. 12/414,476, (Aug. 3, 2011),21 pages.
"Non-Final Office Action", U.S. Appl. No. 12/433,605, (Jun. 24, 2011),10 pages.
"Non-Final Office Action", U.S. Appl. No. 12/433,667, (Jun. 7, 2011),15 pages.
"Non-Final Office Action", U.S. Appl. No. 12/433,667, (Feb. 3, 2012),16 pages.
"Non-Final Office Action", U.S. Appl. No. 12/469,419, (Nov. 9, 2011),15 pages.
"Non-Final Office Action", U.S. Appl. No. 12/469,419, (May 23, 2012),13 pages.
"Non-Final Office Action", U.S. Appl. No. 12/469,458, (Jul. 1, 2011),15 pages.
"Non-Final Office Action", U.S. Appl. No. 12/469,458, (Sep. 21, 2012),14 pages.
"Non-Final Office Action", U.S. Appl. No. 12/469,480, (Oct. 17, 2012),16 pages.
"Non-Final Office Action", U.S. Appl. No. 12/469,480, (Sep. 22, 2011),14 pages.
"Non-Final Office Action", U.S. Appl. No. 12/470,558, (Nov. 22, 2011),9 pages.
"Non-Final Office Action", U.S. Appl. No. 12/480,969, (Aug. 7, 2012),15 pages.
"Non-Final Office Action", U.S. Appl. No. 12/484,799, (Aug. 11, 2011),12 pages.
"Non-Final Office Action", U.S. Appl. No. 12/484,799, (Aug. 7, 2012),13 pages.
"Non-Final Office Action", U.S. Appl. No. 12/484,845, (Dec. 7, 2011),16 pages.
"Non-Final Office Action", U.S. Appl. No. 12/560,081, (Dec. 7, 2011),16 pages.
"Non-Final Office Action", U.S. Appl. No. 12/983,106, (Nov. 9, 2012),17 pages.
"Non-Final Office Action", U.S. Appl. No. 13/492,495, (Sep. 17, 2012),8 pages.
"Notice of Allowance", U.S. Appl. No. 11/305,789, (Nov. 23, 2009),8 pages.
"Notice of Allowance", U.S. Appl. No. 12/414,382, (Apr. 4, 2012),4 pages.
"Notice of Allowance", U.S. Appl. No. 12/414,434, (Aug. 17, 2012),4 pages.
"Notice of Allowance", U.S. Appl. No. 12/414,455, (Jan. 4, 2012),4 pages.
"Notice of Allowance", U.S. Appl. No. 12/414,458, (Oct. 31, 2011),2 pages.
"Notice of Allowance", U.S. Appl. No. 12/414,458, (Nov. 29, 2011),2 pages.
"Notice of Allowance", U.S. Appl. No. 12/414,458, (Aug. 10, 2011),6 pages.
"Notice of Allowance", U.S. Appl. No. 12/470,558, (Apr. 2, 2012),7 pages.
"Notice of Allowance", U.S. Appl. No. 12/470,558, (Aug. 23, 2012),2 pages.
"Notice of Allowance", U.S. Appl. No. 12/484,799, (Oct. 22, 2012),10 pages.
"Notice of Allowance", U.S. Appl. No. 12/484,845, (Mar. 16, 2012),5 pages.
"Notifications", retrieved from <http://msdn.microsoft.com/en-us/library/aa511497.aspx> on May 10, 2011,16 pages.
"OmneMon™ System Resource Metrics", retrieved from <http://www.omnesys.com/documents/OmneMonSRM_Brochure.pdf> on Jun. 10, 2011,3 pages.

"ONYX Graphics Announces New ONYX Prepedge Job Preparation Software", retrieved from <http://www.largeformatreview.com/rip-software/433-onyx-graphics-announces-new-onyx-> on May 10, 2011,2 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009. (Dec. 1999),8 pages.
"Oracle8i Application Developer's Guide—Advanced Queuing", Retrieved from: http://www.cs.umbc.edu/help/oracle8/server.815/a68005/03_adq1i.htm on May 6, 2009., (Feb. 1999),29 Pages.
"Oracle8i Concepts Release 8.1.5", Retrieved from: http://www.cs.umbc.edu/help/oracle8/server.815/a67781/c16queue.htm on May 6, 2009., (Feb. 1999),10 Pages.
"Palette Extender 1.0.2", Retrieved from: <http://palette-extender.en.softonic.com/symbian> on Nov. 6, 2008, (Jan. 21, 2003),2 pages.
"Parallax Scrolling", Retrieved from: <http://en.wikipedia.org/wiki/Parallax_scrolling> on May 5, 2009., (May 4, 2009),3 Pages.
"PCT Search Report and Written Opinion", Application No. PCT/US2009/061382, (May 26, 2010),10 pages.
"PCT Search Report and Written Opinion", Application No. PCT/US2009/061735, (Jun. 7, 2010),11 pages.
"PCT Search Report and Written Opinion", Application No. PCT/US2010/028699, (Oct. 4, 2010),10 pages.
"PCT Search Report and Written Opinion", Application No. PCT/US2010/028555, (Oct. 12, 2010),10 pages.
"PCT Search Report and Written Opinion", Application No. PCT/US2010/034772, (Dec. 29, 2010),12 pages.
"PCT Search Report and Written Opinion", Application No. PCT/US2011/055511, (Apr. 24, 2012),9 pages.
"PCT Search Report and Written Opinion", Application No. PCT/US2011/055520, (May 9, 2012),8 pages.
"PCT Search Report and Written Opinion", Application No. PCT/US2011/055523,(May 10, 2012),9 pages.
"PCT Search Report and Written Opinion", Application No. PCT/US2011/055513, (Mar. 27, 2012),8 pages.
"PCT Search Report and Written Opinion", Application No. PCT/US2011/055512,(May 24, 2012),8 pages.
"PCT Search Report and Written Opinion", Application No. PCT/US2011/055524, (Jun. 1, 2012),8 pages.
"PCT Search Report and Written Opinion", Application No. PCT/US2011/065702, (Aug. 29, 2012),8 pages.
"PCT Search Report and Written Opinion", Application No. PCT/US2011/055712, (Sep. 21, 2012),9 pages.
"PCT Search Report and Written Opinion", Application No. PCT/US2011/055736, (Sep. 17, 2012),8 pages.
"PCT Search Report and Written Opinion", Application No. PCT/US2011/055496, (Sep. 12, 2012),9 pages.
"PCT Search Report and Written Opinion", Application No. PCT/US2011/067073, (Sep. 17, 2012),8 pages.
"PCT Search Report and Written Opinion", Application No. PCT/US2011/055746, (Sep. 27, 2012),9 pages.
"PCT Search Report and Written Opinion", Application No. PCT/US2011/055725, (Sep. 27, 2012),10 pages.
"PCT Search Report and Written Opinion", Application No. PCT/US2011/055478, (Sep. 27, 2012),9 pages.
"PCT Search Report and Written Opinion", Application No. PCT/US2011/055493, (Sep. 26, 2012),9 pages.
"PCT Search Report and Written Opinion", PCT Application No. PCT/US2010/038730, (Jan. 19, 2011),8 pages.
"PCT Search Report", Application Serial No. PCT/US2009/061864, (May 14, 2010),10 pages.
"Push Notifications Overview for Windows Phone", Retrieved from: <http://msdn.microsoft.com/en-us/library/ff402558%28VS.92%29.aspx> on Sep. 30, 2010, (Sep. 3, 2010),1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005),5 Pages.
"SecureMe-Anti-Theft Security Application for S60 3rd", <Retrieved from: http:/www.killermobile.com/newsite/mobile-software/s60-applications/secureme-%11-anti%11theft-security-application-for-s60-3rd.htm> on Jun. 28, 2011, (Dec. 15, 2008),3 pages.

(56) References Cited

OTHER PUBLICATIONS

"Snap", *Windows 7 Features*, retrieved from <http://windows.microsoft.com/en-US/windows7/products/features/snap> on Sep. 23, 2011,2 pages.
"Symbian Applications", Retrieved from: <http://symbianfullversion.blogspot.com/2008_12_01_archive.html> on May 5, 2009., (Jan. 2009),51 Pages.
"The Map Screen", retrieved from <http://www.symbianos.org/whereamiusersguide> on Jun. 17, 2011,3 pages.
"Top 3 Task Switchers for Andriod", *TechCredo*, retrieved from <http://www.techcredo.com/android/top-3-task-switchers-for-android>on May 11, 2011,(Mar. 9, 2011),5 pages.
"Top Android App: Swipepad", *Best Android Apps Review*, retrieved from <http://www.bestandroidappsreview.com/2011/01/top-android-app-swipepad-launcher.html> on May 11, 2011,4 pages.
"Touch Shell Free", Retrieved from: <http://www.pocketpcfreeware.mobi/download-touch-shell-free.html> on May 5, 2009., (Feb. 23, 2009),2 Pages.
"User Guide", retrieved from <http://wireframesketcher.com/help/help.html> on Jun. 17, 2011,19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011,(Jun. 2, 2011),6 pages.
"Windows Phone 7 (Push Notification)", retrieved from <http://unknownerror.net/2011-06/windows-phone-7-push-notification-36520> on Jul. 6, 2011,4 pages.
"Windows Phone 7 Live Tiles", Retrieved from: <http://www.knowyourmobile.com/microsoft/windowsphone7/startscreen/640737/windows_phone_7_live_tiles.html> on May 11, 2011,(Oct. 20, 2010),3 pages.
"Winterface Review", Retrieved from: <http://www.mytodayscreen.com/winterface-review/> on Nov. 12, 2008, (Jul. 9, 2008),42 pages.
"Womma", Retrieved from: <http://www.womma.org/blog/links/wom-trends/> on May 5, 2009., (2007),70 Pages.
"Working with Multiple Windows", *MSOFFICE tutorial!*, retrieved from <http://www.msoffice-tutorial.com/working-with-multiple-windows.php> on Sep. 23, 2011,3 pages.
"YUI 3: ScrollView [beta]", Retrieved from: <http://developer.yahoo.com/yui/3/scrollview/> on Sep. 28, 2010, 5 pages.
Bates, John "A Framework to Support Large-Scale", *University of Cambridge Computer Laboratory*, Available at <http://citeseerx.ist.psu.edu/viewdoc/download?doi=10.1.1.48.1690&rep1&type=pdf>, (1996),8 pages.
Beiber, Gerald et al., "Screen Coverage: A Pen-Interaction Problem for PDA's and Touch Screen Computers", In Proceedings of ICWMC 2007,(Mar. 2007),6 pages.
Bjork, Steffan et al., "Redefining the Focus and Context of Focus=Context Visualizations", *In Proceedings of INFOVIS 2000*, Available at <http://www.johan.redstrom.se/papers/redefining.pdf>,(Oct. 2000),9 pages.
Bowes, James et al., "Transparency for Item Highlighting", *Faculty of Computing Science, Dalhousie University*, Available at <http://torch.cs.dal.ca/~dearman/pubs/GI2003-bowes,dearman,perkins-paper.pdf>,(2003),2 pages.
Buring, Thorsten "User Interaction with Scatterplots on Small Screens—A Comparative Evaluation of Geometric-Semantic Zoom and Fisheye Distortion", *IEEE Transactions on Visualization and Computer Graphics*, vol. 12, Issue 5, Available at <http://citeseerx.ist.psu.edu/viewdoc/download?doi=10.1.1.134.4568&rep=rep1&type=pdf >,(Sep. 2006),pp. 829-836
Carrera, Enrique V., et al., "Conserving Disk Energy in Network Servers", available at <http://citeseerx.ist.psu.edu/viewdoc/download?doi=10.1.1.6.8301&rep=rep1&type=ps>,(Nov. 2002),15 pages.
Cawley, Christian "How to Customise Your Windows Phone 7", Retrieved from: <http://www.brighthub.com/mobile/windows-mobile-platform/articles/95213.aspx> on May 10, 2011,(Nov. 12, 2010),3 pages.
Cawley, Christian "Windows Phone 7 Customization Tips and Tricks", retrieved from <http://www.brighthub.com/mobile/windows-mobile-platform/articles/95213.aspx> on Jun. 20, 2011,(May 16, 2011),2 pages.
Cohen, Michael F., et al., "Wang Tiles for Image and Texture Generation", *In Proceedings of SIGGRAPH 2003*, Available <http://research.microsoft.com/en-us/um/people/cohen/WangFinal.pdf>,(2003),8 pages.
Damien, "7 Ways to Supercharge Multitasking in Android", retrieved from <http://maketecheasier.com/7-ways-to-supercharge-multitasking-in-android/2011/01/22/> on May 11, 2011,(Jan. 22, 2011),5 pages.
Davis, Ashley "A WPF Custom Control for Zooming and Panning", Retrieved from: <http://www.codeproject.com/KB/WPF/zoomandpancontrol.aspx> on Sep. 28, 2010, (Jun. 29, 2010),21 pages.
Delimarsky, Den "Sending Tile Push Notifications on Windows Phone 7", retrieved from <http://mobile.dzone.com/articles/sending-tile-push> on May 10, 2011,(Aug. 25, 2010),2 pages.
Denoue, Laurent et al., "WebNC: Efficient Sharing of Web Applications", *In Proceedings of WWW 2009*, Available at <http://www.fxpal.com/publications/FXPAL-PR-09-495.pdf>,(2009),2 pages.
Dolcourt, Jessica "Webware", Retrieved from: <http://news.cnet.com/webware/?categoryId=2010> on May 5, 2009., (May 5, 2009),13 Pages.
Dunsmuir, Dustin "Selective Semantic Zoom of a Document Collection", Available at <http://www.cs.ubc.ca/~tmm/courses/533/projects/dustin/proposal.pdf>,(Oct. 30, 2009),pp. 1-9.
Fisher, Bill "Cool Discussion of Push Notifications—Toast and Tile—on Windows Phone", Retrieved from: <http://www.windowsphoneexpert.com/Connection/forums/p/4153/18399.aspx> on Sep. 29, 2010, (May 3, 2010),3 pages.
Gade, Lisa "Samsung Alias u740", Retrieved from: <http://www.mobiletechreview.com/phones/Samsung-U740.htm> on Nov. 20, 2008, (Mar. 14, 2007),6 pages.
Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007),pp. 1-42.
Ha, Rick et al., "SIMKEYS: An Efficient Keypad Configuration for Mobile Communications", Retrieved from: <http://ieeexplore.ieee.org/stamp/stamp.jsp?arnumber=01362557.> (Nov. 2004),7 Pages.
Harrison, Richard "Symbian OS C++ for Mobile Phones Volume 3", Retrieved from: <http:// www.amazon.co.uk/Symbian-OS-Mobile-Phones-Press/dp/productdescription/0470066415> on Oct. 23, 2008, Symbian Press,(Jun. 16, 2003), 4 pages.
Hickey, Andrew R., "Google Android has Landed; T-Mobile, HTC Unveil G1", Retrieved from: <http://www.crn.com/retail/210603348> on Nov. 26, 2008., (Sep. 23, 2008),4 pages.
Janecek, Paul et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf> ,(Feb. 15, 2005),pp. 1-15.
Kcholi, Avi "Windows CE .NET Interprocess Communication", Retrieved from http://msdn.microsoft.com/en-us/library/ms836784.aspx on Jul. 17, 2008., (Jan. 2004),15 Pages.
La, Nick "Parallax Gallery", Available at <http://webdesignerwall.comtutorials/parallax-gallery/comment-page-1>,(Apr. 25, 2008),16 pages.
Long, Todd "Gmail Manager 0.6", Retrieved from: <https://addons.mozilla.org/en-US/firefox/addon/1320/> on Sep. 29, 2010, (Jan. 27, 2010),4 pages.
Mann, Richard et al., "Spectrum Analysis of Motion Parallax in a 3D Cluttered Scene and Application to Egomotion", *Journal of the Optical Society of America A*, vol. 22, No. 9 Available at <http://www.cs.uwaterloo.ca/~mannr/snow/josa-mann-langer.pdf>,(Sep. 2005),pp. 1717-1731.
Mantia, Louie "Multitasking: What Does It Mean?", retrieved from <http://mantia.me/blog/multitasking/> on Sep. 23, 2011,3 pages.

(56) References Cited

OTHER PUBLICATIONS

Mao, Jeng "Comments of Verizon Wireless Messaging Services, LLC", Retrieved from:http://www.ntia.doc.gov/osmhome/warnings/comments/verizon.htm on May 6, 2009., (Aug. 18, 2000),5 Pages.

Marie, Angelina "MacBook Trackpad Four Fingers Swipe Left/Right to Switch Applications", *MacBook Junkie*, retrieved from <http://www.macbookjunkie.com/macbook-trackpad-four-fingers-swipe-left-right-to- switch-applications/> on May 11, 2011,(Nov. 13, 2010),4 pages.

Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (Dec. 26, 2006),pp. 1757-1760.

Nordgren, Peder "Development of a Touch Screen Interface for Scania Interactor", *Master's Thesis in Computing Science, UMEA University*, Available at <http://www.cs.umu.se/education/examina/Rapporter/PederNordgren.pdf>,(Apr. 10, 2007),pp. 1-59.

Oliver, Sam "Potential iPhone Usability and Interface Improvements", Retrieved from: http://www.appleinsider.com/articles/08/09/18/potential_iphone_usability_and_interface_improvements.html> on Nov. 12, 2008, AppleInsider,(Sep. 18, 2008),4 pages.

Oryl, Michael "Review: Asus P527 Smartphone for North America", Retrieved from: http://www.mobileburn.com/review.jsp?Id=4257> on Dec. 17, 2008., (Mar. 5, 2008),1 Page.

Padilla, Alfredo "Palm Treo 750 Cell Phone Review—Hardware", Retrieved from: http://www.wirelessinfo.com/content/palm-Treo-750-Cell-Phone-Review/Hardware.htm> on Dec. 11, 2008., (Mar. 17, 2007),4 Pages.

Paul, Ryan "Hands-on: KDE 4.5 Launches with Tiling, New Notifications", Retrieved from: <http://aerstechnica.com/open-source/reviews/2010/08/hands-on-kde-45-launches-with-tiling-new-notifications.ars> on Sep. 29, 2010, (Aug. 2010),3 pages.

Raghaven, Gopal et al., "Model Based Estimation and Verification of Mobile Device Performance", Available at http://alumni.cs.ucsb.edu/~raimisl/emsoft04_12.pdf.,(Sep. 27-29, 2004),10 Pages.

Ray, Bill "Microsoft Re-Tiles Mobile Platform for Windows 7 Era", retrieved from <http://www.theregister.co.uk/2010/02/15/windows_phone_7_series/> on May 11, 2011,(Feb. 15, 2010),2 pages.

Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008, (Apr. 2, 2008),1 page.

Remond, Mickael "Mobile Marketing Solutions", Retrieved from: <http://www.mobilemarketingmadazine.co.uk/mobile_social_networking/> on May 5, 2009., (Apr. 28, 2009),16 Pages.

Rice, Stephen V., et al., "A System for Searching Sound Palettes", *Proceedings of the Eleventh Biennial Symposium on Arts and Technolgy.*, Available at <http://www.comparisonics.com/FindSoundsPalettePaper.pdf>,(Feb. 2008),6 pages.

Ritchie, Rene "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, (Jun. 14, 2010),2 pages.

Ritscher, Walt "Using Surface APIs in your WPF application—Part 1", Retrieved from: <http://blog.wpfwonderland.com/2009/06/30/using-surface-apis-in-your-wpf-application/> on Sep. 28, 2010, (Jun. 30, 2009),7 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.

Sandoval, Guillermo L., "A development platform and execution environment for mobile applications", *Universidad Autónoma de Baja California, School of Chemical Engineering Sciences and Engineering*, Available at <http://citeseerx.ist.psu.edu/viewdoc/download?doi=10.1.1.86.7989&rep=rep1&type=pdf> ,(2004),18 pages.

Singh, Kundan et al., "CINEMA: Columbia InterNet Extensible Multimedia Architecture", Available at <http://www1.cs.columbia.edu/~library/TR-repository/reports/reports-2002/cucs-011-02.pdf>,(Sep. 3, 2002),83 Pages.

Smith, Greg et al., "GroupBar: The TaskBar Evolved", *Proceedings of OZCHI 2003*, Available at <http://research.microsoft.com/pubs/64316/ozchi2003-groupbar.pdf>,(Nov. 2003),pp. 1-10.

Steinicke, Frank et al., "Multi-Touching 3D Data: Towards Direct Interaction in Stereoscopic Display Environments coupled with Mobile Devices", *Advanced Visual Interfaces (AVI) Workshop on Designing Multi-Touch Interaction Techniques for Coupled Public*, Available at <http://viscg.uni-muenster.de/publications/2008/SHSK08/ppd-workshop.-pdf.>,(Jun. 15, 2008),4 Pages.

Suror, "PocketShield—New Screenlock App for the HTC Diamond and Pro", Retrieved from. <http://wmpoweruser.com/?tag=htc-touch-diamond> on Jun. 28, 2011, (Oct. 23, 2008),2 pages.

Terpstra, Brett "Beta Beat: Grape, a New Way to Manage Your Desktop Clutter", Retrieved from: Beta Beat: Grape, a New Way to Manage Your Desktop Clutter on Jun. 28, 2011, (Apr. 14, 2009),4 pages.

Vallerio, Keith S., et al., "Energy-Efficient Graphical User Interface Design", Retrieved from: <http://www.cc.gatech.edu/classes/AY2007/cs7470_fall/zhonq-energy-efficient-user-interface.pdf>, (Jun. 10, 2004), pp. 1-13.

Vermeulen, Jan "BlackBerry PlayBook Hands-on", retrieved from <http://mybroadband.co.za/news/gadgets/20104-BlackBerry-PlayBook-hands-.html> on May 11, 2011,(May 8, 2011),4 pages.

Viticci, Federico "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011,(Jul. 6, 2011),6 pages.

Vornberger, Jan "Bluetile", Retrieved from: <http://www.bluetile.org> on Sep. 29, 2010, 5 pages.

Wilson, Andrew D., "Robust Computer Vision-Based Detection of Pinching for One and Two-Handed Gesture Input", *In Proceedings of UIST 2006*, Available at <http://research.microsoft.com/en-us/um/people/awilson/publications/wilsonuist2006/uist%202006%20taffi.pdf>,(Oct. 2006),4 pages.

Wilson, Tracy V., "How the iPhone Works", Retrieved from: <http://electronics.howstuffworks.com/iphone2.htm> on Apr. 24, 2009, (Jan. 2007),9 pages.

Wobbrock, Jacob O., et al., "User-Defined Gestures for Surface Computing", *CHI 2009*, Apr. 4-9, 2009, Boston, MA, available at <http://faculty.washington.edu/wobbrock/pubs/chi-09.2.pdf>,(Apr. 4, 2009),10 pages.

Wu, Chung et al., "Achieving a Superior Ownership Experience in Manageability and Quality for Siebel CRM", available at <http://www.oracle.com/us/products/enterprise-manager/superior-exp-for-siebel-crm-068962.pdf>,(Aug. 2008),25 pages.

Wyatt, Paul "/Flash/the art of parallax scrolling", .net Magazine,(Aug. 1, 2007),pp. 74-76.

Yang, Seungji et al., "Semantic Photo Album Based on MPEG-4 Compatible Application Format", Retrieved from: <http://ieeexplore.ieee.org/stamp/stamp.jsp?arnumber=04146254.>, (2007),2 Pages.

"Final Office Action", U.S. Appl. No. 11/502,264, (Mar. 29, 2013), 16 pages.

"Final Office Action", U.S. Appl. No. 13/657,646, (May 6, 2013), 12 pages.

"My Favorite Gadgets, System Monitor II", Retrieved from on <http://www.myfavoritegadgets.info/monitors/SystemMonitorII/systemmonitorII.html> Mar. 12, 2013, (Jun. 8, 2010), 5 pages.

"Non-Final Office Action", U.S. Appl. No. 13/118,204, (Feb. 28, 2013), 13 pages.

"Non-Final Office Action", U.S. Appl. No. 13/118,257, (Mar. 5, 2013), 19 pages.

"Non-Final Office Action", U.S. Appl. No. 13/229,693, (Mar. 12, 2013), 21 pages.

"Notice of Allowance", U.S. Appl. No. 13/492,495, (Apr. 26, 2013), 5 pages.

"PCT Search Report and Written Opinion", Application No. PCT/US2012/047091, (Dec. 27, 2012), 15 pages.

(56) References Cited

OTHER PUBLICATIONS

Bruzzese, J. P., "Using Windows 7, Managing and Monitoring Windows 7—Chapter 11", *Que Publishing*, (May 5, 2010), 33 pages.

Gralla, Preston "Windows XP Hacks, Chapter 13—Hardware Hacks", O'Reilly Publishing, (Feb. 23, 2005), 25 pages.

Horowitz, Michael "Installing and Tweaking Process Explorer part 2", Retrieved from <http://web.archive.org/web/20110510093838/http://blogs.computerworld.com/16165/instailing_and_tweaking_process_explorer_part_2> on Mar. 12, 2013, (May 23, 2010), 7 pages.

"Final Office Action", U.S. Appl. No. 12/721,422, (Mar. 7, 2013),10 pages.

"Final Office Action", U.S. Appl. No. 13/118,339, (Aug. 22, 2013), 21 pages.

"Final Office Action", U.S. Appl. No. 13/224,258, (Sep. 11, 2013), 37 pages.

"Final Office Action", U.S. Appl. No. 13/229,693, (Sep. 4, 2013), 23 pages.

"Final Office Action", U.S. Appl. No. 13/656,574, (Aug. 23, 2013), 20 pages.

"Final Office Action", U.S. Appl. No. 13/657,621, (Sep. 10, 2013),18 pages.

"Non-Final Office Action", U.S. Appl. No. 12/721,422, (Oct. 1, 2012), 7 pages.

"Non-Final Office Action", U.S. Appl. No. 13/196,272, (Sep. 3, 2013), 5 pages.

"Notice of Allowance", U.S. Appl. No. 12/721,422, (Jul. 11, 2013), 9 pages.

"Supplemental Notice of Allowance", U.S. Appl. No. 12/977,584, (Sep. 16, 2013), 2 pages.

"You've Got Mail 1.4 Build", retrieved from <http://www.fileshome.com/Shows_Animation_Plays_Sound_Automatic_N . . . > on Jan. 6, 2010 (Jun. 18, 2007), 2 pages.

Farrugia, Michael et al., "Cell Phone Mini Challenge: Node-Link Animation Award Animating Multivariate Dynamic Social Networks", *IEEE Symposium on Visual Analytics Science and Technology*, Columbus, OH, USA, Oct. 21-23, 2008, (Oct. 21, 2008), 2 pages.

Keranen, Jaakko "OpenGL-based User Interface Toolkit for Symbian Mobile Devices", *Master of Science Thesis, Tamere University of Technology, Department of Information Technology*, (Apr. 6, 2005), 88 pages.

"Final Office Action", U.S. Appl. No. 12/972,967, (Oct. 11, 2013), 21 pages.

"Final Office Action", U.S. Appl. No. 12/983,106, (Oct. 7, 2013),19 pages.

"Final Office Action", U.S. Appl. No. 13/118,204, (Nov. 21, 2013), 24 pages.

"Non-Final Office Action", U.S. Appl. No. 13/228,707, (Oct. 25, 2013),12 pages.

"Non-Final Office Action", U.S. Appl. No. 13/228,876, (Nov. 22, 2013),14 pages.

"Non-Final Office Action", U.S. Appl. No. 13/229,155, (Nov. 18, 2013),14 pages.

"Non-Final Office Action", U.S. Appl. No. 13/655,390, (Dec. 17, 2012),12 pages.

"Notice of Allowance", U.S. Appl. No. 12/978,184, (Nov. 6, 2013), 5 pages.

"Notice of Allowance", U.S. Appl. No. 13/196,272, (Nov. 8, 2013), 8 pages.

"Supplemental Notice of Allowance", U.S. Appl. No. 12/977,584, (Oct. 11, 2013), 2 pages.

"Supplemental Notice of Allowance", U.S. Appl. No. 13/655,390, (Sep. 19, 2013), 2 pages.

"Final Office Action", U.S. Appl. No. 13/118,321, Dec. 19, 2013, 30 pages.

"Foreign Office Action", CN Application No. 201110437572.2, Dec. 3, 2013, 7 pages.

"Non-Final Office Action", U.S. Appl. No. 13/228,888, Feb. 10, 2014, 21 pages.

"Supplemental Notice of Allowance", U.S. Appl. No. 12/978,184, Feb. 25, 2014, 2 pages.

"Final Office Action", U.S. Appl. No. 13/073,300, Apr. 1, 2014, 14 pages.

"Final Office Action", U.S. Appl. No. 13/118,333, Apr. 23, 2014, 22 pages.

"Final Office Action", U.S. Appl. No. 13/228,707, May 21, 2014, 16 pages.

"Final Office Action", U.S. Appl. No. 13/229,155, Jun. 12, 2014, 15 pages.

"Gestures Programming", Retrieved from <http://doc.qt.digia.com/4.6/gestures-overview.html> on May 28, 2014, 2010, 3 pages.

"Image Gestures Example", Retrieved from <http://doc.qt.digia.com/4.6/gestures-imagegestures.html> on May 28, 2014, 2010, 3 pages.

"Non-Final Office Action", U.S. Appl. No. 13/118,265, Jun. 10, 2014, 13 pages.

"Non-Final Office Action", U.S. Appl. No. 13/118,292, Jun. 6, 2014, 25 pages.

"Non-Final Office Action", U.S. Appl. No. 13/228,931, Apr. 7, 2014, 21 pages.

"Non-Final Office Action", U.S. Appl. No. 13/228,945, Apr. 14, 2014, 22 pages.

"Non-Final Office Action", U.S. Appl. No. 13/229,556, Mar. 28, 2014, 12 pages.

"Non-Final Office Action", U.S. Appl. No. 13/229,709, Apr. 7, 2014, 12 pages.

"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.

"Notice of Allowance", U.S. Appl. No. 13/655,386, Apr. 25, 2014, 6 pages.

"QPinchGesture Class Reference", Retrieved from <http://doc.qt.digia.com/4.6/qpinchgesture.html> on May 28, 2014, 2010, 6 pages.

Anson, "Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.

"Final Office Action", U.S. Appl. No. 13/224,258, Jul. 18, 2014, 39 pages.

"Final Office Action", U.S. Appl. No. 13/228,876, Jul. 18, 2014, 15 pages.

"First Examination Report", NZ Application No. 618269, May 20, 2014, 2 pages.

"First Examination Report", NZ Application No. 618284, May 20, 2014, 2 pages.

"Foreign Office Action", CN Application No. 201180071186.4, Jun. 13, 2014, 12 pages.

"Non-Final Office Action", U.S. Appl. No. 13/118,288, Jul. 2, 2014, 17 pages.

"Non-Final Office Action", U.S. Appl. No. 13/229,693, Jun. 20, 2014, 25 pages.

"Non-Final Office Action", U.S. Appl. No. 13/229,702, Jul. 3, 2014, 28 pages.

"Non-Final Office Action", U.S. Appl. No. 13/657,621, Jul. 18, 2014, 22 pages.

"Non-Final Office Action", U.S. Appl. No. 13/657,646, Aug. 12, 2014, 14 pages.

"Notice of Allowance", U.S. Appl. No. 13/118,204, Jul. 8, 2014, 8 pages.

"Notice of Allowance", U.S. Appl. No. 13/657,789, Aug. 4, 2014, 16 pages.

"Final Office Action", U.S. Appl. No. 13/345,383, Jul. 25, 2014, 26 pages.

"Foreign Office Action", CN Application No. 201210317470.1, Jun. 5, 2014, 12 pages.

"Non-Final Office Action", U.S. Appl. No. 12/983,106, Sep. 10, 2014, 19 pages.

(56) References Cited

OTHER PUBLICATIONS

"Notice of Allowance", U.S. Appl. No. 13/229,556, Sep. 10, 2014, 12 pages.
"Notice of Allowance", U.S. Appl. No. 13/229,709, Sep. 2, 2014, 4 pages.
"Supplemental Notice of Allowance", U.S. Appl. No. 13/118,204, Sep. 10, 2014, 2 pages.
"Foreign Office Action", CN Application No. 201110429183.5, Aug. 21, 2014, 13 Pages.
"Foreign Office Action", CN Application No. 201210331686.3, Jun. 13, 2014, 13 pages.
"Notice of Allowance", U.S. Appl. No. 13/656,574, Sep. 23, 2014, 7 pages.
"Supplemental Notice of Allowance", U.S. Appl. No. 13/118,204, Oct. 2, 2014, 2 pages.
"Extended European Search Report", EP Application No. 11866579.3, Oct. 9, 2014, 7 pages.
"Final Office Action", U.S. Appl. No. 13/118,265, Nov. 6, 2014, 19 pages.
"Final Office Action", U.S. Appl. No. 13/118,288, Nov. 7, 2014, 14 pages.
"Final Office Action", U.S. Appl. No. 13/118,292, Dec. 5, 2014, 30 pages.
"Final Office Action", U.S. Appl. No. 13/228,888, Oct. 24, 2014, 29 pages.
"Final Office Action", U.S. Appl. No. 13/228,945, Oct. 23, 2014, 24 pages.
"Foreign Notice of Acceptance", NZ Application No. 618269, Oct. 31, 2014, 1 Page.
"Foreign Office Action", CN Application No. 201110454251.3, Oct. 21, 2014, 13 Pages.
"Foreign Office Action", CN Application No. 201180071196.8, Sep. 11, 2014, 13 pages.
"Non-Final Office Action", U.S. Appl. No. 12/972,967, Nov. 6, 2014, 17 pages.
"Non-Final Office Action", U.S. Appl. No. 13/118,321, Nov. 12, 2014, 33 pages.
"Non-Final Office Action", U.S. Appl. No. 13/118,347, Dec. 3, 2014, 28 pages.
"Non-Final Office Action", U.S. Appl. No. 13/228,707, Nov. 13, 2014, 20 pages.
"Non-Final Office Action", U.S. Appl. No. 14/089,149, Nov. 3, 2014, 8 pages.
"Non-Final Office Action", U.S. Appl. No. 14/109,779, Nov. 21, 2014, 9 pages.
"Notice of Allowance", U.S. Appl. No. 14/089,149, Dec. 5, 2014, 4 pages.
"Supplemental Notice of Allowance", U.S. Appl. No. 13/118,204, Oct. 23, 2014, 3 pages.
Webmonkey "HTML Cheatsheet", Retrieved From: <http://www.webmonkey.com/2010/02/html_cheatsheet> on Nov. 7, 2014, Feb. 15, 2010, 5 pages.
"Corrected Notice of Allowance", U.S. Appl. No. 13/656,574, Dec. 12, 2014, 4 pages.
"Extended European Search Report", EP Application No. 11866553.8, Dec. 9, 2014, 7 pages.
"Extended European Search Report", EP Application No. 11867033.0, Nov. 27, 2014, 8 pages.
"Final Office Action", U.S. Appl. No. 13/228,931, Dec. 19, 2014, 27 pages.
"Foreign Office Action", CO Application No. 13300256, Sep. 24, 2014, 8 Pages.
"Foreign Office Action", CO Application No. 13300265, Sep. 24, 2014, 10 Pages.
"Non-Final Office Action", U.S. Appl. No. 13/118,339, Dec. 10, 2014, 16 pages.
"Corrected Notice of Allowance", U.S. Appl. No. 14/089,149, Feb. 20, 2015, 2 pages.
"Foreign Office Action", CN Application No. 201210331188.9, Oct. 10, 2014, 12 pages.
"Foreign Office Action", CN Application No. 201210331564.4, Dec. 3, 2014, 12 pages.
"Foreign Office Action", CN Application No. 201210331584.1, Nov. 3, 2014, 14 pages.
"Non-Final Office Action", U.S. Appl. No. 13/228,876, Jan. 29, 2015, 18 pages.
"Notice of Allowance", U.S. Appl. No. 13/657,646, Feb. 6, 2015, 15 pages.
"Extended European Search Report", EP Application No. 11866699.9, Jan. 15, 2015, 6 pages.
"Extended European Search Report", EP Application No. 11866772.4, Jan. 15, 2015, 6 pages.
"Foreign Notice of Allowance", CN Application No. 201110437572.2, Mar. 3, 2015, 3 Pages.
"Foreign Office Action", CN Application No. 201110437542.1, Jan. 28, 2015, 7 pages.
"Foreign Office Action", CN Application No. 201110437542.1, Aug. 20, 2014, 8 pages.
"Foreign Office Action", CN Application No. 201180071186.4, Jan. 20, 2015, 8 pages.
"Non-Final Office Action", U.S. Appl. No. 13/345,383, Jan. 29, 2015, 5 pages.
"Supplemental Notice of Allowance", U.S. Appl. No. 13/656,574, Feb. 25, 2015, 4 pages.
"Supplemental Notice of Allowance", U.S. Appl. No. 14/089,149, Mar. 20, 2015, 2 pages.
"Foreign Office Action", CN Application No. 201110454251.3, Feb. 28, 2015, 9 Pages.
"Non-Final Office Action", U.S. Appl. No. 11/215,052, (Jun. 23, 2011), 17 pages.
"Notice of Allowance", U.S. Appl. No. 11/215,052, (Mar. 14, 2012), 5 pages.
"Foreign Office Action", CN Application No. 201110429183.5, Jan. 6, 2014, 10 Pages.
"Foreign Office Action", CN Application No. 201110437542.1, Jan. 6, 2014, 10 Pages.
"Foreign Office Action", CN Application No. 201110454251.3, Dec. 27, 2013, 12 Pages.
"Restriction Requirement", U.S. Appl. No. 13/118,265, Feb. 27, 2014, 7 pages.
"Restriction Requirement", U.S. Appl. No. 13/118,288, Mar. 4, 2014, 7 pages.
"Final Office Action", U.S. Appl. No. 13/118,347, (Aug. 15, 2013), 25 pages.
"Final Office Action", U.S. Appl. No. 13/655,386, (Jun. 6, 2013), 34 pages.
"Final Office Action", U.S. Appl. No. 13/656,354, (Jun. 17, 2013), 14 pages.
"Final Office Action", U.S. Appl. No. 13/657,789, (Jun. 21, 2013), 35 pages.
"Non-Final Office Action", U.S. Appl. No. 13/073,300, (Jul. 25, 2013), 13 pages.
"Non-Final Office Action", U.S. Appl. No. 13/118,321, (Jun. 10, 2013), 32 pages.
"Non-Final Office Action", U.S. Appl. No. 13/118,333, (Jul. 5, 2013), 18 pages.
"Notice of Allowance", U.S. Appl. No. 12/977,584, (Jun. 19, 2013), 5 pages.
"Notice of Allowance", U.S. Appl. No. 12/978,184, (Aug. 2, 2013), 5 pages.
"Notice of Allowance", U.S. Appl. No. 13/655,390, (May 24, 2013), 5 pages.
"Supplemental Notice of Allowance", U.S. Appl. No. 13/655,390, (Jul. 25, 2013), 2 pages.
Kurdi, Samer "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, (Jan. 19, 2010), 6 pages.
Kurdi, Samer "WinSplit Revolution", Retrieved from <http://www.freewaregenius.com/winsplit-revolution/> on Jun. 30, 2013, (Aug. 22, 2007), 4 Pages.

(56) References Cited

OTHER PUBLICATIONS

"Final Office Action", JP Application No. 2014-529685, Apr. 5, 2016, 6 pages.
"Foreign Notice of Allowance", CN Application No. 201210317470.1, Feb. 23, 2016, 4 pages.
"Foreign Notice of Allowance", CN Application No. 201210331584.1, Feb. 14, 2016, 4 pages.
"Foreign Notice of Allowance", JP Application No. 2014-512819, Jan. 26, 2016, 4 pages.
"Foreign Office Action", CN Application No. 201180071183.0, Jan. 28, 2016, 18 pages.
"Foreign Office Action", EP Application No. 11866579.3, Apr. 5, 2016, 4 pages.
"Foreign Office Action", EP Application No. 11866699.9, Feb. 3, 2016, 4 pages.
"iOS Human Interface Guidelines", Apple Inc, Retrieved at <<https://itunes.apple.com/in/book/ios-human-interface-guide-lines/id877942287?mt=11>>, Mar. 23, 2011, 2 pages.
"Non-Final Office Action", U.S. Appl. No. 13/228,707, Apr. 19, 2016, 26 pages.
"Non-Final Office Action", U.S. Appl. No. 13/228,931, Mar. 24, 2016, 22 pages.
"Non-Final Office Action", U.S. Appl. No. 14/522,420, Apr. 22, 2016, 21 pages.
"Notice of Allowance", U.S. Appl. No. 14/059,163, Apr. 25, 2016, 7 pages.
Budiu,"Usability of iPad Apps and Websites", Retrieved at<<https://tdougher.expressions.syr.edu/wrt307fall12/files/2012/08/ipad-usability_report_1st-edition-1.pdf>>, Dec. 31, 2010, 98 pages.
"Corrected Notice of Allowance", U.S. Appl. No. 14/659,442, Nov. 10, 2015, 2 pages.
"Corrected Notice of Allowance", U.S. Appl. No. 14/659,442, Nov. 27, 2015, 2 pages.
"Extended European Search Report", EP Application No. 11871739.6, Oct. 5, 2015, 13 pages.
"Extended European Search Report", EP Application No. 11872164.6, Sep. 18, 2015, 8 pages.
"Final Office Action", U.S. Appl. No. 13/657,621, Jan. 21, 2016, 21 pages.
"Final Office Action", U.S. Appl. No. 14/059,163, Dec. 3, 2015, 6 pages.
"Foreign Office Action", CL Application No. 3370-2013, Oct. 29, 2015, 6 pages.
"Foreign Office Action", EP Application No. 11866772.4, Feb. 2, 2016, 5 pages.
"Foreign Office Action", EP Application No. 1866699.9, Feb. 3, 2016, 4 pages.
"Foreign Office Action", JP Application No. 2014-512824, Nov. 6, 2015, 5 pages.
"Foreign Office Action", JP Application No. 2014-528371, Sep. 29, 2015, 16 pages.
"Foreign Office Action", JP Application No. 2014-529671, Sep. 29, 2015, 16 pages.
"Foreign Office Action", JP Application No. 2014-529684, Nov. 4, 2015, 10 pages.
"Foreign Office Action", JP Application No. 2014-529685, Nov. 4, 2015, 5 pages.
"Foreign Office Action", JP Application No. 2014-529687, Oct. 20, 2015, 8 pages.
"Foreign Office Action", RU Application No. 2013152630, Oct. 26, 2015, 5 pages.
"Foreign Office Action", RU Application No. 2013152635, Oct. 28, 2015, 7 pages.
"Foreign Office Action", RU Application No. 2014107906, Oct. 6, 2015, 6 pages.
"Foreign Office Action", RU Application No. 2014108844, Oct. 27, 2015, 6 pages.
"Foreign Office Action", RU Application No. 2014108874, Oct. 6, 2015, 6 pages.
"Foreign Office Action", RU Application No. 2014108997, Oct. 14, 2015, 6 pages.
"International Search Report and Written Opinion", Application No. PCT/US2015/048751, Nov. 27, 2015, 12 pages.
"Introduction to Windows 7", https://www.google.com/url?q=http://www.wright.edu/sites/default/files/page/attachements/windows7.pdf, Jul. 1, 2010, 13 pages.
"Non-Final Office Action", U.S. Appl. No. 13/118,292, Dec. 7, 2015, 32 pages.
"Notice of Allowance", U.S. Appl. No. 13/073,300, Feb. 12, 2016, 9 pages.
"Samsung Galaxy 2 TouchWiz 4.0 Tour (Homescreen, Settings, etc)", https://www.youtube.com/watch?v=oXBbiy0Adiw, May 9, 2011, 3 pages.
D,"Android Apps in Depth—02—Go Launcher EX", https://www.youtube.com/watch?v=u5LISE8BU_E, Mar. 6, 2011, 3 pages.
D,"Android HTC EVO 4G Tutorials 01—Getting Started, Home Screens", https://www.youtube.com/watch?v=fwvt-rsCMA8, Feb. 3, 2011, 3 pages.
Demers,"In Depth: GO Launcher EX—Droid Life", http://www.droid-life.com/2011/01/26/in-depth-go-launcher-ex/, Jan. 26, 2011, 8 pages.
Sakumi,"Browse/Creation Tool for Hierarchy Contents with Concept Pad System: Zoomable User Interface", In Lecture Note/Software Science 23 Interactive System and Software VIII, Dec. 20, 1999, 8 pages.
Stein,"Growing Beautiful Code in BioPerl", In Beautiful Code—Leading Programmers Explain How They Think, Oreilly, 2007, 32 pages.
Takahiro,"Let's Manage the Installed Applications", In Easy to Use Mini, Exhaustion Utilization of iPhone, vol. 1, p. 25 Memo, Mar. 10, 2011, 6 pages.
Toshiyuki,"User Interaction Technique for Mobile Terminal (First Part)—Display Interaction Technique—Information Processing", In Information Processing Society of Japan, vol. 48, No. 6, Jun. 15, 2007, 12 pages.
"Corrected Notice of Allowance", U.S. Appl. No. 13/118,333, Aug. 4, 2015, 4 pages.
"Corrected Notice of Allowance", U.S. Appl. No. 13/118,333, Sep. 14, 2015, 4 pages.
"Corrected Notice of Allowance", U.S. Appl. No. 14/109,779, Oct. 19, 2015, 2 pages.
"Extended European Search Report", EP Application No. 11872072.1, Jul. 28, 2015, 7 pages.
"Final Office Action", U.S. Appl. No. 13/073,300, Sep. 4, 2015, 17 pages.
"Final Office Action", U.S. Appl. No. 13/224,258, Aug. 13, 2015, 39 pages.
"Foreign Notice of Allowance", CN Application No. 201110437542.1, Aug. 3, 2015, 4 Pages.
"Foreign Notice of Allowance", CN Application No. 201210331158.8, Sep. 8, 2015, 3 Pages.
"Foreign Office Action", CN Application No. 201110454251.3, Sep. 30, 2015, 10 Pages.
"Foreign Office Action", CN Application No. 201210317470.1, Aug. 24, 2015, 9 pages.
"Foreign Office Action", CN Application No. 201210331564.4, Sep. 2, 2015, 14 pages.
"Foreign Office Action", CN Application No. 201210331584.1, Aug. 19, 2015, 7 pages.
"Foreign Office Action", CN Application No. 201210331686.3, Sep. 1, 2015, 11 pages.
"Foreign Office Action", EP Application No. 11866579.3, Sep. 3, 2015, 4 pages.
"Foreign Office Action", JP Application No. 2014-512819, Sep. 29, 2015, 4 pages.
"Foreign Office Action", JP Application No. 2014-529672, Oct. 6, 2015, 7 pages.
"Non-Final Office Action", U.S. Appl. No. 13/118,265, Aug. 20, 2015, 18 pages.
"Non-Final Office Action", U.S. Appl. No. 13/118,288, Aug. 24, 2015, 19 pages.

(56) References Cited

OTHER PUBLICATIONS

"Non-Final Office Action", U.S. Appl. No. 13/118,321, Sep. 8, 2015, 34 pages.
"Non-Final Office Action", U.S. Appl. No. 14/059,163, Aug. 10, 2015 , 5 pages.
"Notice of Allowance", U.S. Appl. No. 13/229,693, Sep. 14, 2015, 13 pages.
"Notice of Allowance", U.S. Appl. No. 14/659,442, Aug. 19, 2015, 4 pages.
"Search Report", TW Application No. 100136568, Sep. 14, 2015, 2 pages.
Gladisch,"MultiStates: Monitoring Databases With Acoustic and Intuitive Perspective Wall Interaction", In Proceedings of 2nd International Workshop on Design & Evaluation of e-Government Applications and Services, Aug. 24, 2009, 7 pages.
Johnson,"Create an Awesome Zooming Web Page With jQuery", Retrieved from <http://designshack.net/articles/javascript/create-an-awesome-zooming-web-page-with-jquery/> on Aug. 20, 2015, May 25, 2011, 11 pages.
"Final Office Action", U.S. Appl. No. 13/118,292, Aug. 26, 2016, 38 pages.
"Final Office Action", U.S. Appl. No. 13/228,707, Aug. 23, 2016, 33 pages.
"Final Office Action", U.S. Appl. No. 13/228,876, Sep. 13, 2016, 21 pages.
"Foreign Notice of Allowance", CN Application No. 201210331670.2, Apr. 26, 2016, 4 pages.
"Foreign Notice of Allowance", JP Application No. 2014-529687, May 31, 2016, 4 pages.
"Foreign Notice of Allowance", RU Application No. 2014107906, Apr. 25, 2016, 18 pages.
"Foreign Notice of Allowance", RU Application No. 2014108997, May 26, 2016, 17 pages.
"Foreign Notice of Allowance", TW Application No. 100136568, May 31, 2016, 4 pages.
"Foreign Office Action", CN Application No. 201110454251.3, May 27, 2016, 6 Pages.
"Foreign Office Action", CN Application No. 201210085754.2, Apr. 5, 2016, 16 pages.
"Foreign Office Action", CN Application No. 201210331670.2, Dec. 1, 2015, 14 pages.
"Foreign Office Action", JP Application No. 2014-512824, Jun. 7, 2016, 6 pages.
"Foreign Office Action", JP Application No. 2014-528371, Jun. 7, 2016, 5 pages.
"Foreign Office Action", PH Application No. 1-2013-502367, Jun. 15, 2016, 2 pages.
"Foreign Office Action", RU Application No. 2014108844, Jun. 23, 2016, 6 pages.
"Non-Final Office Action", U.S. Appl. No. 13/228,876, May 12, 2016, 20 pages.
"Non-Final Office Action", U.S. Appl. No. 13/228,945, Jul. 21, 2016, 20 pages.
"Non-Final Office Action", U.S. Appl. No. 14/522,420, Aug. 15, 2016, 20 pages.
"Non-Final Office Action", U.S. Appl. No. 14/850,347, Jun. 16, 2016, 26 pages.
"Notice of Allowance", U.S. Appl. No. 12/983,106, Jun. 6, 2016, 17 pages.
"Notice of Allowance", U.S. Appl. No. 13/657,621, Aug. 26, 2016, 9 pages.
"Examiner's Answer to Appeal Brief", U.S. Appl. No. 13/224,258, Sep. 23, 2016, 12 pages.
"Foreign Office Action", EP Application No. 11866699.9, Sep. 20, 2016, 4 pages.
"Non-Final Office Action", U.S. Appl. No. 14/919,607, Sep. 23, 2016, 11 pages.
"Notice of Allowance", U.S. Appl. No. 13/228,931, Sep. 23, 2016, 10 pages.
"Second Written Opinion", U.S. Appl. No. PCT/US2015/048751, Jul. 12, 2016, 5 pages.
"Corrected Notice of Allowance", U.S. Appl. No. 13/228,931, Oct. 31, 2016, 2 pages.
"Corrected Notice of Allowance", U.S. Appl. No. 13/657,621, Oct. 31, 2016, 2 pages.
"Foreign Office Action", Application No. MX/a/2014/002507, Aug. 9, 2016, 7 pages.
"Foreign Office Action", AU Application No. 2011369365, Oct. 7, 2016, 3 pages.
"Foreign Office Action", AU Application No. 2011375741, Sep. 14, 2016, 4 pages.
"Foreign Office Action", AU Application No. 2011376310, Sep. 10, 2016, 3 pages.
"Foreign Office Action", AU Application No. 2011376311, Sep. 10, 2016, 3 pages.
"Non-Final Office Action", U.S. Appl. No. 14/918,358, Oct. 13, 2016, 9 pages.
"Corrected Notice of Allowance", U.S. Appl. No. 13/228,931, Nov. 30, 2016, 2 pages.
"Corrected Notice of Allowance", U.S. Appl. No. 13/657,621, Dec. 1, 2016, 3 pages.
"Foreign Notice of Allowance", JP Application No. 2014-512824, Oct. 18, 2016, 4 pages.
"Foreign Notice of Allowance", JP Application No. 2014-528371, Oct. 4, 2016, 4 pages.
"Foreign Notice of Allowance", JP Application No. 2014-529685, Oct. 19, 2016, 4 pages.
"Foreign Office Action", Application No. MX/a/2013/013923, Sep. 13, 2016, 10 pages.
"Foreign Office Action", EP Application No. 11866772.4, Nov. 21, 2016, 6 pages.
"Non-Final Office Action", U.S. Appl. No. 14/918,359, Nov. 22, 2016, 9 pages.
"Corrected Notice of Allowance", U.S. Appl. No. 13/228,931, Dec. 29, 2016, 2 pages.
"Extended European Search Report", EP Application No. 11850624.5, Dec. 21, 2016, 9 pages.
"Final Office Action", U.S. Appl. No. 13/228,945, Jan. 12, 2017, 23 pages.
"Final Office Action", U.S. Appl. No. 14/850,347, Dec. 23, 2016, 6 pages.
"Foreign Office Action", AU Application No. 2011369362, Nov. 15, 2016, 3 pages.
"Foreign Office Action", AU Application No. 2011376310, Nov. 7, 2016, 3 pages.
"How to Run iPhone Apps Full Screen on iPad Full Force—Quick Tip #8—iOS Vlog 35", Retrieved from <<https://www.youtube.com/watch?v=csccfh80QZ8>>, Jul. 31, 2010, 1 page.
"Non-Final Office Action", U.S. Appl. No. 14/586,364, Dec. 28, 2016, 7 pages.
"Restriction Requirement", U.S. Appl. No. 14/558,666, Jan. 13, 2017, 6 pages.
"Foreign Notice of Allowance", AU Application No. 2011369365, Jan. 25, 2017, 3 pages.
"Foreign Office Action", CN Application No. 201110454251.3, Feb. 4, 2017, 7 pages.
"Foreign Office Action", EP Application No. 11866553.8, Feb. 8, 2017, 6 pages.
"Foreign Office Action", EP Application No. 11867033.0, Feb. 8, 2017, 7 pages.

\* cited by examiner

AGGREGATION OF COMPUTING DEVICE SETTINGS

RELATED APPLICATIONS

This application is a continuation of and claims priority under 35 U.S.C. §120 to U.S. patent application Ser. No. 11/215,052, filed Aug. 30, 2005, and titled "Aggregation of PC Settings", the entire disclosure of which being incorporated by reference in its entirety.

BACKGROUND

In recent years, computer systems have become increasingly mobile. A recent study indicated over 24% of U.S. households own at least one laptop computer. In an attempt to meet this demand, original equipment manufacturers ("OEMs") have introduced "laptop class" mice and other mobile specific hardware peripherals that are generally more compact than their desktop counterparts. While such advances have greatly improved mobile computing, adequate mobile software components are lagging. One illustration of this lag is readily apparent to users when they attempt to quickly and efficiently alter computer settings when at various locations. The problem is not isolated with mobile computers as even with stationary computing environments, rapidly adjusting common settings may become an arduous task.

Currently, in many computing environments, the operating system and machine settings are scattered in various control panels ("CPLs") throughout the system, often in distinct and incompatible graphical user interfaces. In most instances, these settings are not in obvious and discoverable locations. For example, one software application may require the user to first execute the entire application, select an options menu and manually adjust a setting, while another may still then require the user to adjust another related setting in a central settings depot, such as Control Panel in Microsoft® Windows® operating system. Indeed, even once a user accesses Control Panel, they must still navigate through numerous options to alter the desired setting.

In contrast, the great majority of mobile users change the environment and context around their machines, and therefore need to modify settings on an on-going basis to adapt to changing conditions and locations; and navigating constantly between the scattered settings UI is tedious and annoying.

SUMMARY

Embodiments described herein relate to a readily discoverable, consolidated UI of frequently modified application and system settings. In one aspect, systems and methods may be deployed to efficiently adjust mobile settings. In one embodiment, tiles configured to represent the an application and include at least one icon, the status of the application, and a user-selectable display element, such as a button, for positioning within each tile, wherein the user can adjust the aspect with a single input to the user selectable display element. In yet another embodiment, the user may select another user-selectable user display element to adjust further aspects of the application.

Another aspect relates to a graphical user interface to implement the above and other collections of tiles to more easily allow a user to view the current status of an aspect of several applications and to adjust an aspect of each element by providing a single input. In one embodiment, a graphical user interface may allow the user to modify which application and which aspects of those applications are displayed on the menu. In yet another embodiment, additional aspects of the applications may be viewed and adjusted through an additional sub-menu by the use of an additional display element, such as a button.

Another aspect relates to a method that may be instituted to determine which applications and/or elements of applications are to be displayed within the menus. In one embodiment, application data may be generated that considers one or more of the following exemplary data categories: the power source of the computer, applications presently active on the computer, the networking environment, applications most utilized on the computer, applications most likely to be utilized on the computer; and/or applications requiring the most frequent adjustment.

A more complete understanding of aggregation of computing device settings and the advantages thereof may be acquired by referring to the following description in consideration of the accompanying drawings, in which like reference numbers indicate like features, and wherein:

DETAILED DESCRIPTION

Exemplary Operating Environment

Figure 1A:
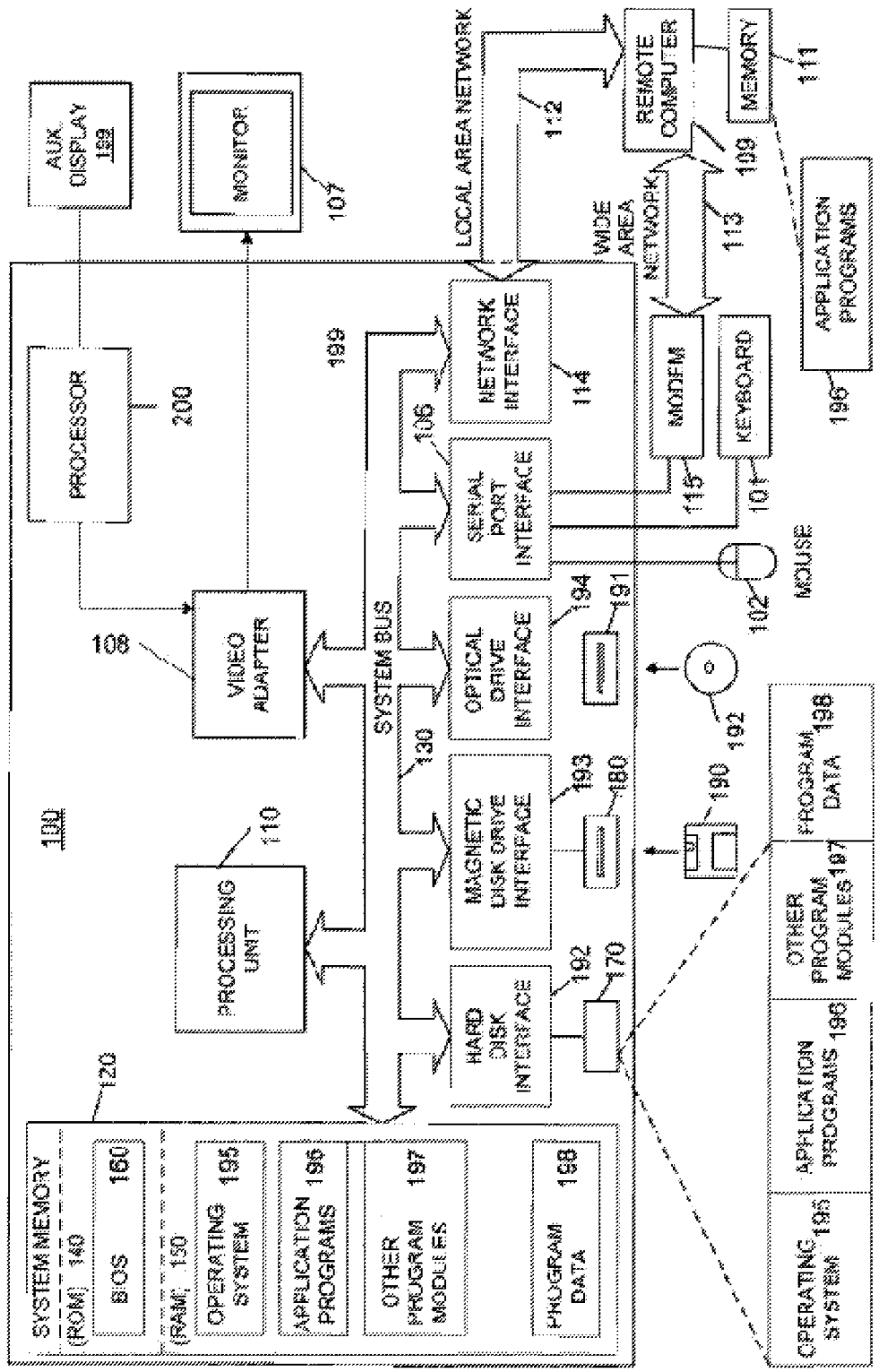
FIG. 1A illustrates a schematic diagram of a general-purpose digital computing environment in which one or more embodiments may be implemented.

FIG. 1A is a functional block diagram of an example of a conventional general-purpose digital computing environment that can be used in connection with various embodiments. In FIG. 1A, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). The illustrated computer 100 includes an optional PCMCIA interface 103 that may connect at least one embodiment of an input device to the computer 100. Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1A. The logical connections depicted in FIG. 1A include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
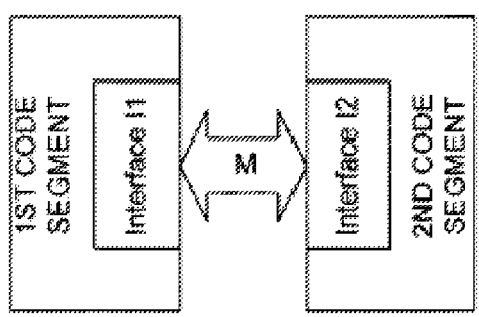
FIG. 1B through 1M show a general-purpose computer environment supporting one or more embodiments.
Figure 1E:
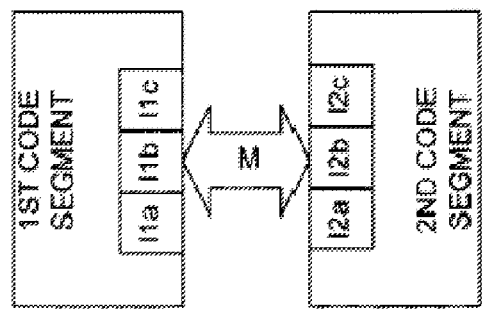
Figure 1B:
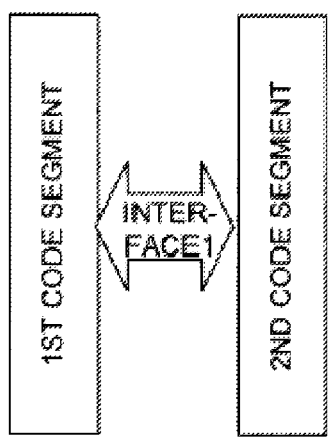

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

Factoring

Figure 1D:
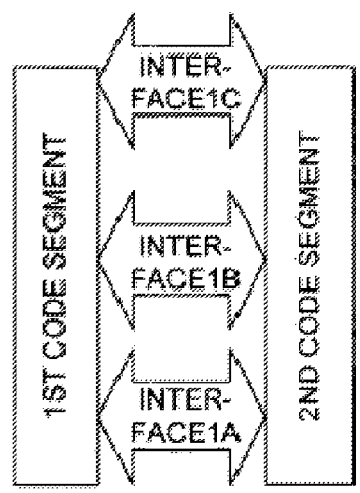

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Redefinition

Figure 1G:
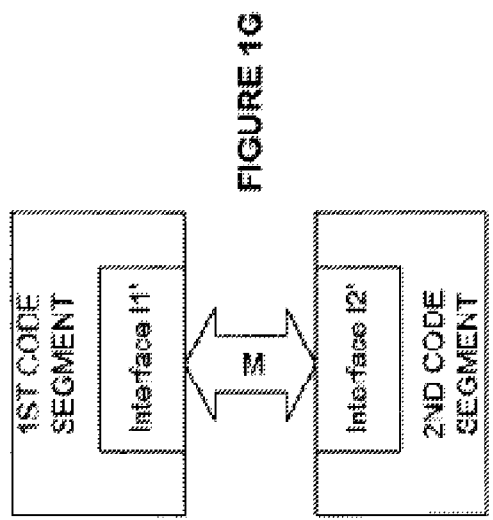
Figure 1I:
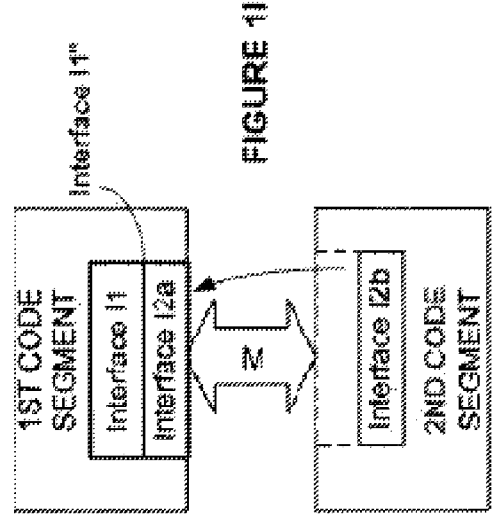
Figure 1F:
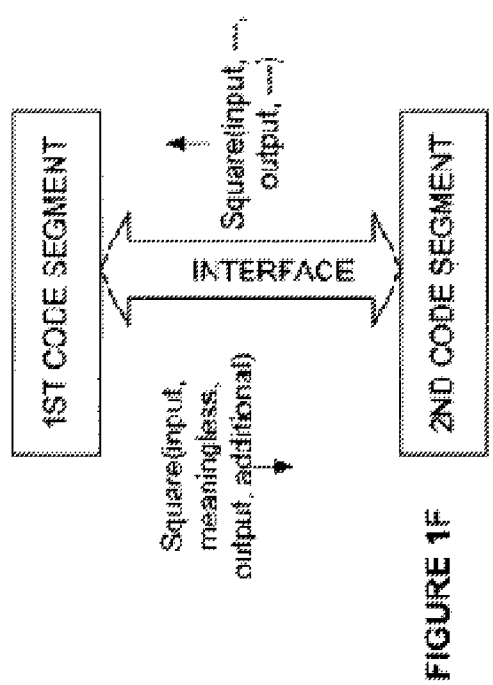

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

Inline Coding

Figure 1H:
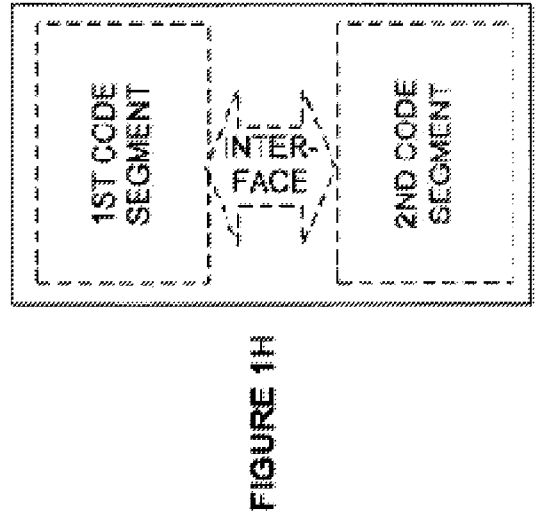

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Divorce

Figure 1K:
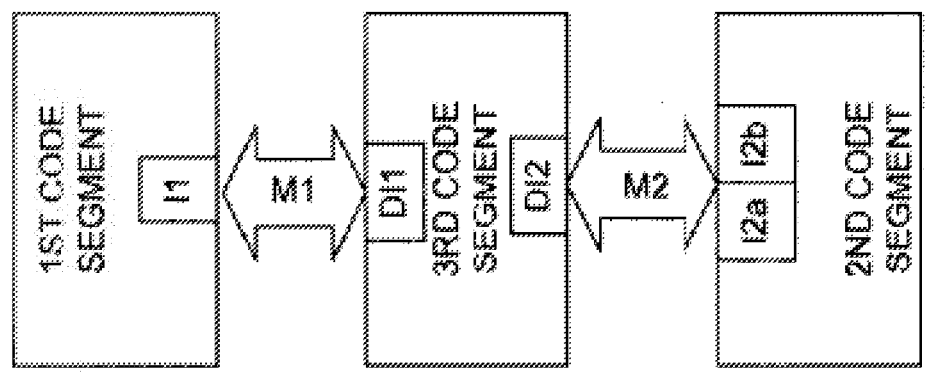
Figure 1J:
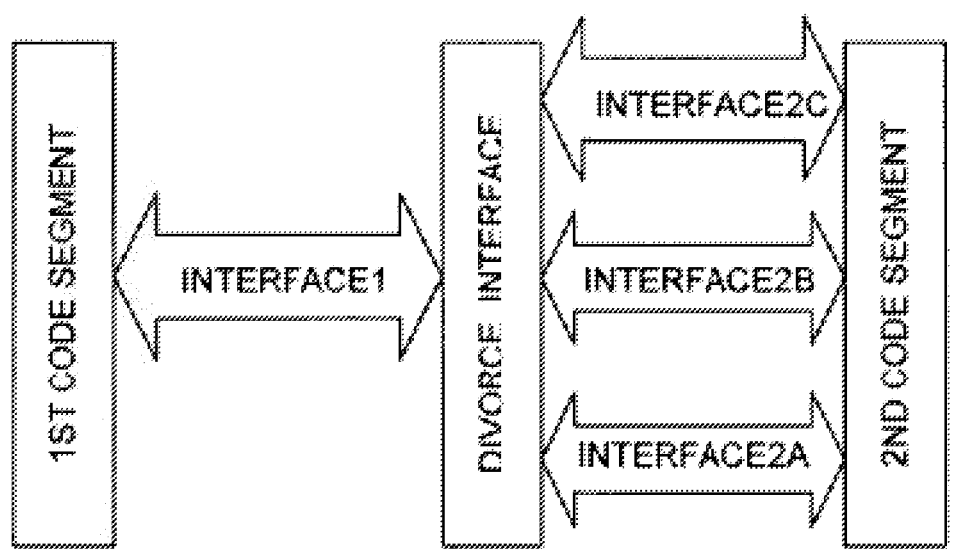

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

Rewriting

Figure 1L:
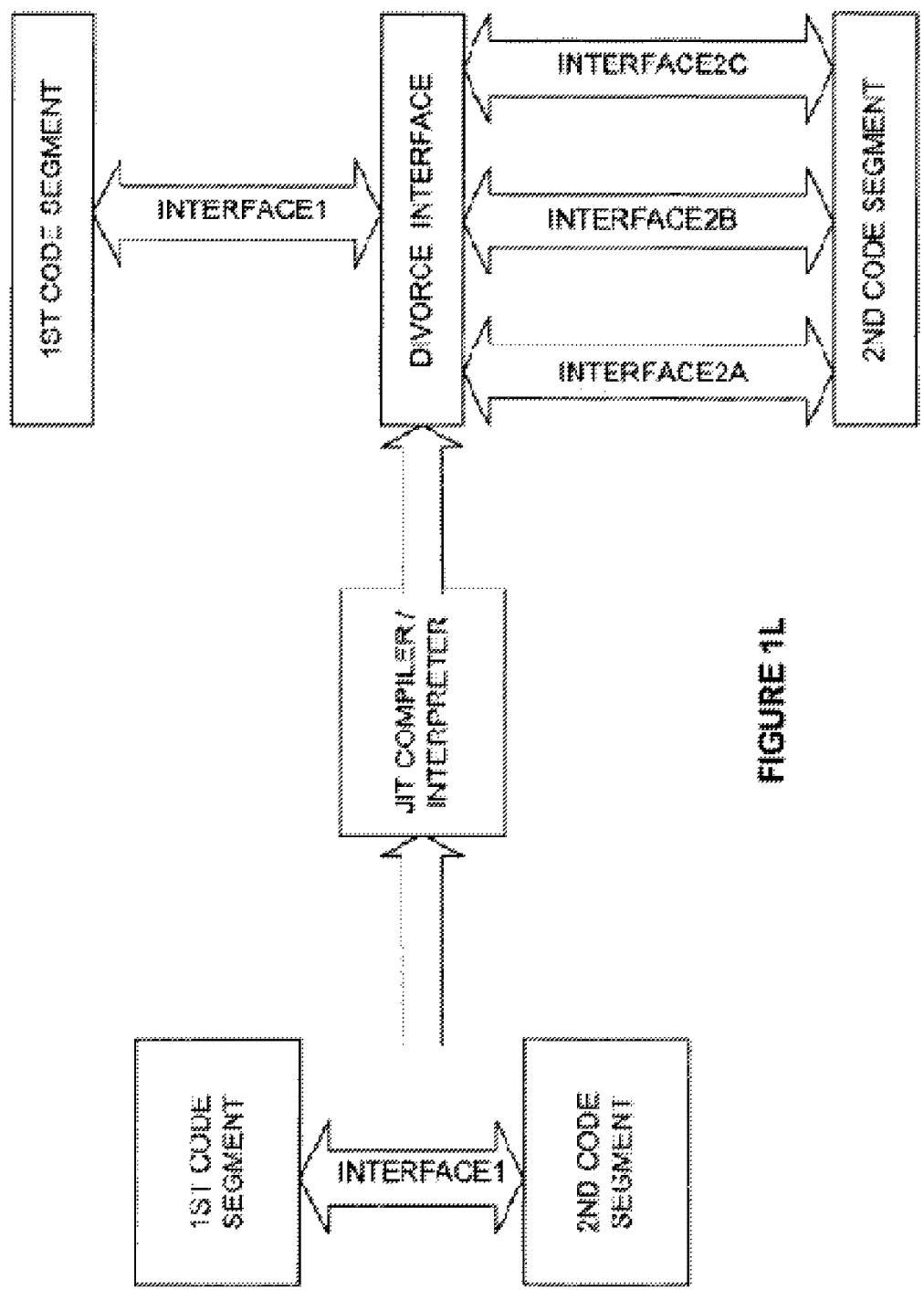
Figure 1M:
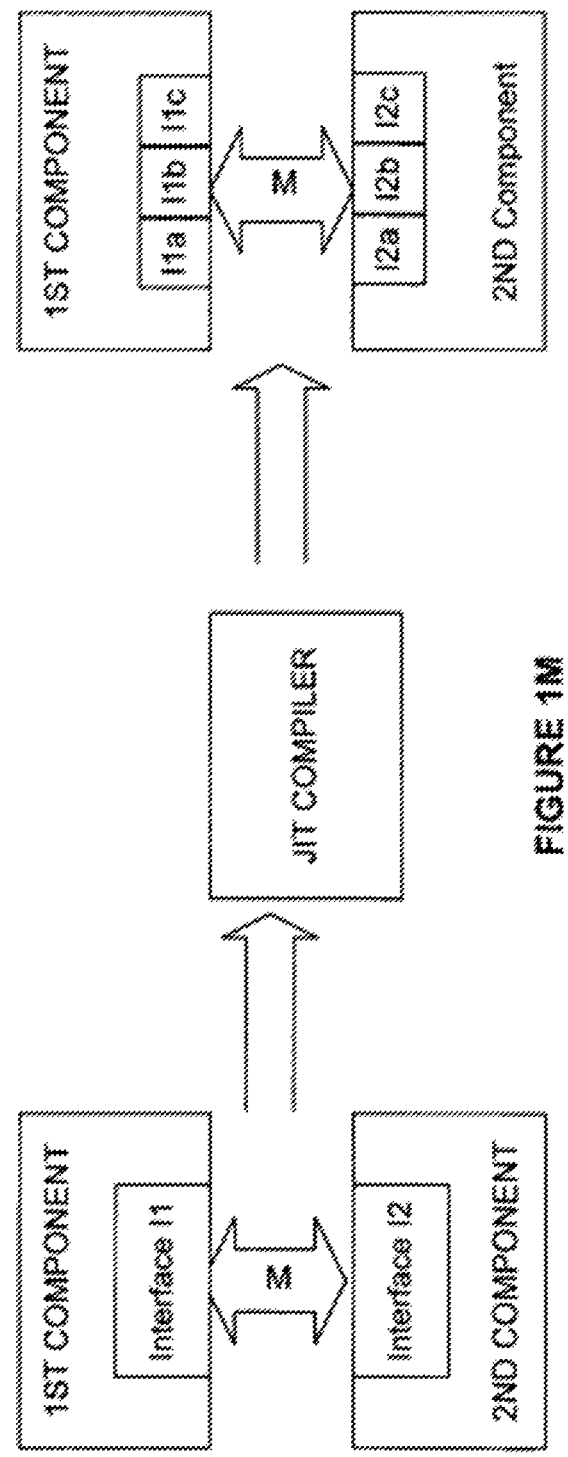

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the described embodiments, i.e., it is noted that it is at least partly the functionality represented by, and the advantageous results enabled by, an interface that underlie the value of an interface.

Description of Illustrative Embodiments

Figure 2:
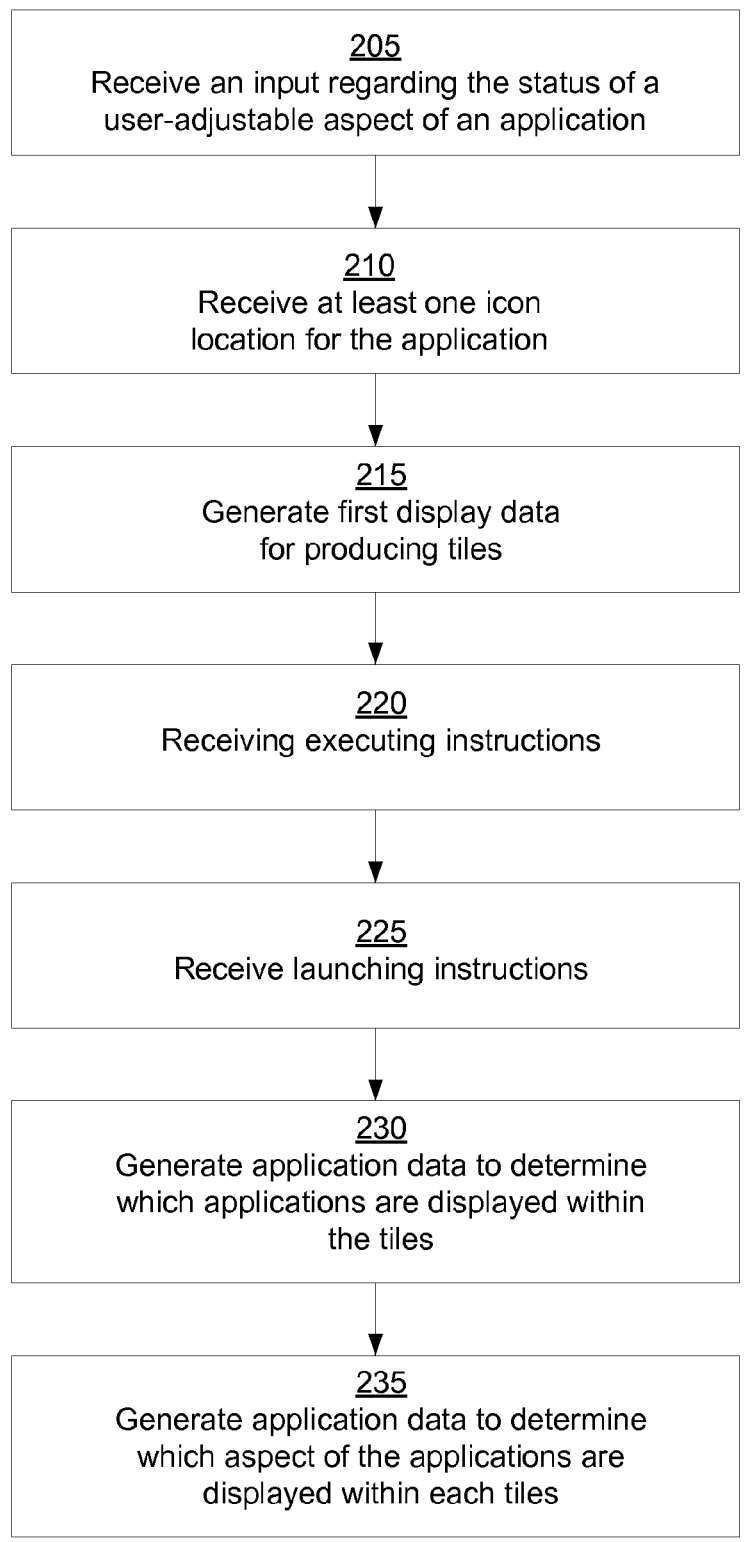
FIG. 2 shows an exemplary method of generating a menu of user-adjustable settings in a computing environment.

FIG. 2 shows an exemplary method of generating a menu of user-adjustable settings in a computing environment. In the illustrative method, an input regarding the status of a user-adjustable aspect for an application available on a computing system is received (step 205). By use of the term "application", it is understood that an application may be software, hardware, firmware, or indeed any computer readable instructions capable of being implemented and adjusted by a user including an operating system, where the user may adjust the system settings. One example of a hardware application may be a video adapter, wherein the user-selectable aspect may relate to the format of the video signal from the adapter, such as whether the image is portrayed in a landscape or portrait format and/or the resolution of the video output displayed on a display device, such as monitor 107. In such an example, the input of the status may be utilized to create a text message, such as "Portrait—1280× 1024" (See step 215, described below); however a graphical representation may be used in place of or in conjunction with a text message to indicate the status of the user-selectable aspect of the application.

One skilled in the art will understand that there are a large number of icons, or other graphical representations that may be used to reflect the status of the application. Moreover, one skilled in the art will also appreciate that a series of inputs regarding the user-adjustable aspect may be received throughout the process described herein, in which the status may be updated to provide a user an accurate indication of such. The graphical representation of the status may be received in accordance with step 210, which describes the reception of at least one icon.

In step 210, at least one icon location for each application represented in the menu is received. The use of an icon may be desirable in situations receiving an input in step 205 that may only support a textual status indication or where additional graphical representations are desired. The icon location maps to a physical location with a computer readable medium. The computer readable medium may be a local fixed drive, such as drive 170, or accessed remotely through a network, such as network adapter 114.

The icon includes at least one graphical representation configured to visually display one aspect of the application. For example, if the user-adjustable aspect concerns the layout of a video output, such as through video adapter 108, a plurality of graphical representations may be used to indicate the current positioning of the layout. Similarly, if the user-selectable aspect concerns the power source currently powering the computing device, an icon may comprise a graphical representation of a battery to indicate a battery is currently supplying the energy. In such an example, the status may be updated to prompt the user of the amount of battery power remaining. As discussed above in relation to step 205, this may be done through the use of text, graphical representations, or combinations thereof. In one such embodiment again regarding the power source, the icon may comprise a graphical representation to indicate the current power source is a plug; however, the status input received may still monitor the battery's charge.

In an alternative embodiment, step 210 may be replaced with a step that includes receiving computer-executable instructions, such as one or more COM objects, that are used to generate an icon. For example, instead of receiving a specific icon location, computer-executable instructions may be received and then used to generate an icon. With respect to a tile representing the state of a battery, the computer-executable instructions may determine the state of the battery and instructions for modifying an existing icon or selecting an icon to represent the state of the battery. If the battery is almost depleted, for example, the computer-executable instructions may change the color of an icon to red to alert the user. The computer-executable instructions may be executed periodically to make any changes to the icons. The use of computer-executable instructions, as opposed to icon locations, provides for greater flexibility when generating tiles.

As one skilled in the art will appreciate, step 210 may occur before, during, and/or after step 205. Indeed, the above examples are only to aid the reader in better understanding aspects of aggregation of computing device settings and are not meant to limit the ordering of the steps described throughout the specification. Moreover, it is to be understood that more or fewer steps may be incorporated into the illustrated method without departing from the scope of the described embodiments.

Figure 3:
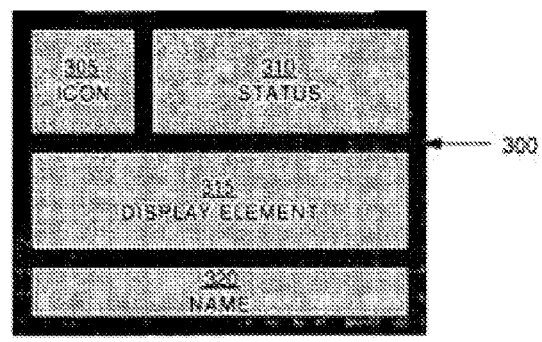
FIG. 3 shows one illustrative tile that may be used in a menu according to one or more embodiments.

In step 215, first display data is generated to create a display or used by an application to create a display having a menu comprising tiles. Each tile of the menu is configured to represent an application. FIG. 3 shows one illustrative tile that may be used in a menu according to one embodiment. As can readily be seen in the figure, tile 300 comprises at least one icon, such as icon 305. Icon 305 is mapped to the icon location received in step 210 described above. The tile 300 also comprises a status display area 310 that displays to a user the status of the application for which the tile represents. In one embodiment, the input received in step 205 is used to determine what status is displayed in the status display area 310. In yet another embodiment, other inputs are used in place of or in conjunction with the input received in step 205 to determine what status is displayed in area 310.

Returning briefly to FIG. 2, executing instructions for allowing a user to adjust the user-adjustable aspect for the application of at least one of the tiles are received in step 220. In one embodiment, the executing instructions are associated with a first user-selectable display element, such as for usage with a graphical user interface. In such an embodiment, a menu comprising a collection of tiles is displayed to a user, such as through monitor 107, wherein at least one of the tiles is associated with a first user selectable display element (see 315 in FIG. 3). The user-selectable display element may be a button, toggle, check-box, or slidable scale, or indeed any mechanism capable of being displayed to a user and adjusted to affect the state of the aspect or entire application.

The tile may be configured so that upon receiving a selection signal indicative of a user interface selection device, such as a mouse input or keyboard stroke, correlating to selection of the first user selectable display element, the state of the displayed aspect of the tile is adjusted without requiring the user to provide further inputs or navigate through additional menus. One skilled in the art will understand that while the term "mouse" was used to exemplify a user interface selection device, a mouse input may be received from any input device that controls movement of a cursor or other mechanism and allows selection of functions on a computer system device. As used herein, the term "mouse" can encompass a wide variety of input devices that provide an input to a computing device, including, but not limited to: "track pads", "track balls", "scrollers", "joy sticks", "soft buttons" "mouse-pens", "light pens" and other positioning or pointing systems. Moreover, while numerous embodiments may comprise a rotatable ball to provide movement, the other embodiments are not limited thereto. It will be appreciated by those in the art that various mouse movement sensing system alternatives are well known and available, such as mice with optical sensors for sensing mouse movements. Moreover, the embodiments described herein are not limited to a mouse-type input device, but rather is may be utilized with a vast array of input devices for a computer system.

At step 225, launching instructions for utilizing second display data to launch a second display, such as an additional menu, are received for at least one application displayed by one of the tiles. In one embodiment, the launching instructions are associated with a second user-selectable display element, such as for usage with a graphical user interface. In such an embodiment, a first menu comprising a collection of tiles is displayed to a user, such as through monitor 107, wherein at least one of the tiles is associated with a second user selectable display element in addition to a first user selectable display element as described above. The tile is configured so that upon receiving a selection signal indicative of a user interface selection device correlating to the selection of the second user selectable display element, a second menu is displayed. The second menu may be within the tile or may be initiated independently of the tile and/or the first menu. The second menu comprises additional adjustable aspects associated with the application represented by the particular tile the display element is within. In one embodiment, the icon, such as icon 305 may serve as a user selectable display element.

Select embodiments of the tiles, such as tile 300 may be customized, such as for example, comprising a tile name (see 330). The tile name may be located anywhere within the tile and may be superimposed over other parts or elements of the tile. In one embodiment, the tile name may be changed by the user of the computer device.

In yet further embodiments, a method may be instituted to determine which applications (step 230) and/or elements of applications (step 235) are to be displayed within the menus. In one embodiment, application data may be generated that considers one or more of the following exemplary data categories:
  the power source of the computer;
  applications presently active on the computer;
  the networking environment, applications most utilized on the computer;
  applications most likely to be utilized on the computer;
  synchronization status
  detection of more than one display device operatively connected to the computer; and/or
  applications requiring most frequent adjustment.

As one skilled in the art will understand, the above data categories provide only a cursory sampling of the vast array of possible priorities to determine what applications and aspects of those applications to display.

In yet other embodiments, aspect data—data that aids in the determination of the identity of the aspect of a particular application shown in the first menu—may be generated that considers one or more of the following exemplary data categories:
  Brightness of at least one display device operatively connected to the computer;
  Orientation of at least one display device operatively connected to the computer power source of the computer;
  Synchronization status;
  Audio volume;
  features of at least one application that are most likely to be utilized; and/or
  features of at least one application that require the most frequent adjustment.

Again, one skilled in the art will understand that the above data categories for possible aspect data provide only a cursory sampling of the vast array of possible priorities to determine what applications and aspects of those applications to display.

Figure 4:
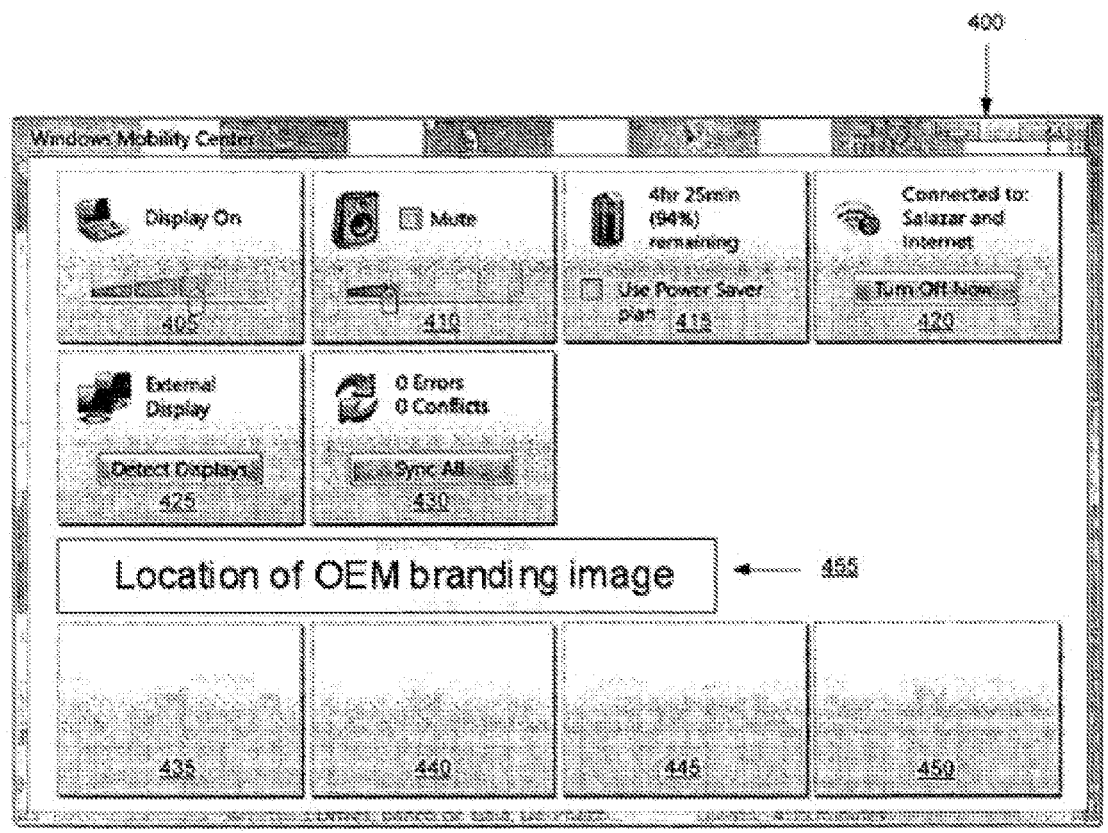
FIG. 4 shows a graphical user interface according to one or more embodiments. The illustrative interface may be incorporated through an operating system.

FIG. 4 shows a graphical user interface according to one embodiment. The illustrative interface may be incorporated through an operating system, such as Microsoft® Windows® operating system. As seen in the figure, a collection of tiles are represented in a menu 405 that is displayed to a user. The menu comprises a collection of tiles, such as tiles 405-430 that each represent a different application available to the user. For example, tile 405 represents a display related application while tile 410 represents an audio related application. As discussed in more detail above, each tile further comprises an icon, an indicia of status of an aspect of the represented application, and at least one user-selectable display element to adjust the aspect of the application.

In one embodiment, a registry key is implemented to direct the computer to the tiles to be used. One exemplary key that may be used to retrieve the proper tiles is Software\Microsoft\MobilePC\MobilityCenter\Tiles, wherein each tile may be represented by a subkey. The ordering of the tiles may be retrieved by a command or registry value and may depend on the default setting, user preferences, or any of the criteria defined above to name a few.

Regarding those embodiments that consider user preferences, the presence of specific tiles and ordering of those tiles may be particularly important to the user. For example, it is well-understood that business travelers are often traveling by airlines. Planes represent one environment where a plurality of settings must be viewed and capable of being changed in a relatively short period of time. Planes are often dark, crowded, and generally audio and network capabilities must be disabled or adjusted. The GUI shown in FIG. 4 may take this and other factors into consideration. In one such embodiment, the GUI may be programmed to provide the menu of tiles to the user each time the user powers up the computer. Yet in another embodiment, the menu may be initiated upon an application detecting a change, such as for example, disconnecting from a video or network source. Yet in still another embodiment, the menu may be manually initiated by the user through the use of a dedicated key, hotkey command, or other input.

In yet other embodiments, a menu may be shown at the top of a z-order. In still yet further embodiments, the menu may be automatically dismissed and/or closed when a user accesses another application or uses an input device, such as a mouse, to "click" outside of the menu. In those embodiments having a GUI operating within Windows® operating system, the menu may be utilized without consuming valuable space on the task bar or within the programs that may be switched between by the user, for example, when viewing the "applications" available on the Task Manager. Yet in other embodiments, it may be desirable to have the menu available on the task bar or other menus where it may be more readable accessible to the user.

Using the readily accessible menu, the user may view the status of important setting for various applications. Returning again to the plane environment, the user may view tile 415 to determine the available battery power remaining, and with a single input enable the user selectable display element entitled "Use Power Saver plan" to further extend the operating time of the computer. Moreover, the user may "double click" or otherwise select the icon, which may serve as a second user selectable display element, that when selected, opens up an additional menu to allow the user to change battery sources or adjust other aspects of the battery related application.

Using the same primary menu shown in the GUI of FIG. 4, the user may view tile 410 to determine the level of audio output from an audio component. By providing a single input the user may disable (mute) or lower the output to acceptable levels for that environment using the slidable scale shown in the tile.

In yet other embodiments, an auxiliary display device 199 may also be in communication with computer 100. The auxiliary device may be integrated within the computer (as shown), detachable, or external. The auxiliary display device 199 may optionally be in communication with an auxiliary processor 200, which may be integrated within the auxiliary display or housed within the computer 100. In such embodiments, the user may detect displays by providing a single input within tile 425 or double click the icon or other mechanism to further adjust settings of the auxiliary display(s).

In still yet further embodiments, the menu of tiles may be configured to allow third-party application vendors or the user to determine what applications are in the tiles. In yet other embodiments, OEMs and/or end-users may have the ability to enable/disable tiles based on supported hardware, personal preference, and other factors. As seen in FIG. 4, tiles 435-450 are currently vacant and may be filed with applications at a later time. For example, when a new application is loaded onto the computer, the user may be prompted as to whether to add a tile to the menu for that new application. Yet in other embodiments, individual OEMs may create a specific tile layout to be used with their specific computers or hardware peripherals. Indeed, according to various embodiments, OEMs and/or end-users may have the ability to rearrange the layout of the tiles as well as the configuration and display characteristics of the tiles. In one such an embodiment, optional space, 455 may be used to display a branding image or such. Allowing OEMs to modify the menu and/or specific tile characteristics while preserving the similarity of the user experience may be highly desirable in some embodiments. For example, one user of the computer may determine to add a tile of a recently installed application to the menu, whereas another user may determine they would prefer not to have a tile for that application. In one such embodiment, the GUI presented to the first user would remain substantially unchanged except with the difference being the presence of that particular tile for the new application, thus providing a common infrastructure for each user to have a unique user experience without having the relearn different UI frameworks or reapply different settings upon logging in. In this regard, the GUI may be specific to a user or class of users and switch depending on the current user or class of users. In yet another embodiment, a tile representing a newly installed application may be presented to both users but the user-adjustable aspect may differ among each UI presented to various users. In still yet further embodiments, the user-adjustable aspect may remain constant among the UIs presented to the different users; however, the mechanism to adjust the aspect may differ. For example, one user may prefer a smaller tile with a check box while another user may prefer a larger tile clickable button.

Aggregation of computing device settings has been described in terms of example embodiments. Numerous other embodiments, modifications and variations within the scope and spirit of the appended claims will occur to persons of ordinary skill in the art from a review of this disclosure.

What is claimed is:

1. A computer readable memory device having computer-executable instructions stored thereon that, responsive to execution by a computing device, cause the computing device to perform a method comprising:
   generating at least one tile for display, the at least one tile being configured to represent a system setting and a status of the system setting, and the at least one tile including one or more user-selectable elements and a visual indicator, the one or more user-selectable elements capable of receiving selection to affect a state of an aspect of the system setting and the visual indicator capable of indicating the state of the aspect of the system setting as affected via manipulation of the one or more user-selectable elements; and causing the at least one tile to be displayed, the at least one tile being presentable in different user interfaces with the one or more user-selectable elements or the visual indicator being displayable differently between two or more of the different user interfaces based on a user preference for the one or more user-selectable elements or the visual indicator.

2. A computer readable memory device as described in claim 1, wherein the at least one tile is displayed in a menu comprising multiple tiles, at least some of the multiple tiles being configured to represent different system settings than others of the multiple tiles.

3. A computer readable memory device as described in claim 2, wherein the menu is configured to enable a user to adjust different aspects of multiple different system settings via the at least some of the multiple tiles without navigating to an additional menu, wherein one or more of the different aspects are adjustable with a single user input.

4. A computer readable memory device as described in claim 1, wherein the one or more user-selectable elements include a display element that is selectable to cause a menu to be displayed, the menu comprising additional user-adjustable aspects associated with the system setting represented by the at least one tile.

5. A computer readable memory device as described in claim 1, wherein the at least one tile is represented by a subkey, and wherein generating the at least one tile for display comprises using the subkey to retrieve the at least one tile and using a registry value to determine an order in which the at least one tile is to be displayed together with one or more other tiles.

6. A computer readable memory device as described in claim 1, wherein the at least one tile is customizable to enable a user to change at least a name of the at least one tile.

7. A computer readable memory device as described in claim 1, wherein the different user interfaces are specific to different respective original equipment manufacturers (OEMs).

8. A computer readable memory device as described in claim 1, wherein one or more characteristics of the one or more user-selectable elements are customizable by a user of the computing device.

9. A computer readable memory device as described in claim 8, wherein the one or more characteristics of the one or more user-selectable elements are customizable to modify one or more of a size of a display of the one or more user-selectable elements or the visual indicator of the one or more user-selectable elements.

10. A computer readable memory device as described in claim 1, wherein the at least one tile is displayed in a menu comprising multiple tiles, wherein one or more of the multiple tiles are vacant and associable with an application.

11. A computing device comprising:
a memory; and
a processor configured to utilize instructions in the memory to cause the computing device to:
generate a menu for display on a display device, the menu comprising a plurality of tiles and at least one tile being configured to represent an application, a status of the application, and include a user-selectable display element including a visual indicator, the user-selectable display element capable of receiving selection to affect a state of an aspect of the application and the visual indicator capable of indicating the state of the aspect of the application as affected via manipulation of the user-selectable element; and
cause the menu to be displayed via a user interface to enable user-interaction with the plurality of tiles, the at least one tile being configured to be presentable to different users of the computing device with the user-selectable element or the visual indicator differing among respective user interfaces presented to two or more of the different users based on a user preference for the user-selectable element or the visual indicator.

12. A computing device as described in claim 11, wherein the aspect of the application includes at least one of layout, brightness, orientation, resolution, signal format, or audio volume.

13. A computing device as described in claim 11, wherein the at least one tile further includes an additional user-selectable display element that is selectable to cause a second menu to be displayed.

14. A computing device as described in claim 13, wherein the second menu includes one or more additional adjustable aspects associated with the application represented by the at least one tile.

15. A computing device as described in claim 13, wherein the second menu is displayed within the at least one tile.

16. A computing device as described in claim 11, wherein the at least one tile is presentable to the different users of the computing device with the user-selectable display element of the at least one tile differing in at least one of size or the visual indicator among respective user interfaces presented to two or more of the different users.

17. A computing device as described in claim 11, wherein a display of the user-selectable display element is customizable by the user.

18. A computing device as described in claim 11, wherein the menu includes one or more tiles that are vacant and which are configured to be subsequently associated with a respective application.

19. A method comprising:
generating a menu for display at a computing device, the menu comprising at least one tile configured to:
represent an application;
include a user-selectable display element including a visual indicator, the user-selectable element capable of receiving selection to affect a state of a user-adjustable aspect of the application and the visual indicator capable of indicating the state of the aspect of the system setting as affected via manipulation of the user-selectable element; and
causing the at least one tile to remain in the menu according to a user preference, the at least one tile being presentable in different user interfaces with the user-selectable element or the visual indicator being displayable differently between two or more of the different user interfaces based on a user preference for user-selectable element or the visual indicator.

20. A method as described in claim 19, wherein the at least one tile is presentable in the different user interfaces with the visual indicator of the user-selectable display element differing between two or more of the different user interfaces based on computing device preferences.

* * * * *